United States Patent
Imayoshi et al.

(10) Patent No.: US 9,455,627 B2
(45) Date of Patent: Sep. 27, 2016

(54) BOOST-TYPE SWITCHING REGULATOR AND SEMICONDUCTOR DEVICE FOR BOOST-TYPE SWITCHING REGULATOR

(71) Applicant: LAPIS SEMICONDUCTOR CO., LTD., Kanagawa (JP)

(72) Inventors: Takahiro Imayoshi, Kanagawa (JP); Akihiro Sushihara, Kanagawa (JP)

(73) Assignee: LAPIS SEMICONDUCTOR CO., LTD, Kanagawa (JP)

( * ) Notice: Subject to any disclaimer, the term of this patent is extended or adjusted under 35 U.S.C. 154(b) by 97 days.

(21) Appl. No.: 14/207,681

(22) Filed: Mar. 13, 2014

(65) Prior Publication Data
US 2014/0312870 A1  Oct. 23, 2014

(30) Foreign Application Priority Data

Mar. 13, 2013 (JP) .................. 2013-051029

(51) Int. Cl.
| | |
|---|---|
| G05F 1/00 | (2006.01) |
| H02M 3/156 | (2006.01) |
| H02M 1/32 | (2007.01) |
| H02M 1/00 | (2006.01) |

(52) U.S. Cl.
CPC ............... H02M 3/156 (2013.01); H02M 1/32 (2013.01); *H02M 2001/0025* (2013.01)

(58) Field of Classification Search
CPC  Y02B 70/126; H02M 3/156; H02M 3/1588; H02M 3/157; G05F 1/63; G05F 1/648
USPC ....... 323/207, 222, 271, 282–285, 293, 298, 323/297
See application file for complete search history.

(56) References Cited

U.S. PATENT DOCUMENTS

| | | | | |
|---|---|---|---|---|
| 6,798,178 B1* | 9/2004 | Bayadroun | ........... | H02M 3/156 323/274 |
| 7,638,987 B2* | 12/2009 | Sugiyama | ............ | H02M 3/156 323/222 |
| 2004/0196013 A1* | 10/2004 | Chen | ..................... | H02M 3/156 323/282 |
| 2005/0156582 A1* | 7/2005 | Redl | ..................... | H02M 3/156 323/282 |
| 2008/0024099 A1* | 1/2008 | Oki | ........................ | H02M 3/156 323/282 |
| 2010/0289424 A1* | 11/2010 | Chang | ................ | H05B 33/0818 315/250 |

FOREIGN PATENT DOCUMENTS

| | | |
|---|---|---|
| JP | 2009-136064 A | 6/2009 |
| JP | 2012-010581 A | 1/2012 |

* cited by examiner

*Primary Examiner* — Nugyen Tran
(74) *Attorney, Agent, or Firm* — Kubotera & Associates, LLC

(57) ABSTRACT

A boost-type switching regulator includes an inductor; a rectifying element; a capacitor; a switching element; an output terminal; a detection voltage generating unit; an output voltage controlling unit; and a detection voltage level shifting unit. The detection voltage generating unit generates a detection voltage according to an output voltage. The output voltage controlling unit turns on and off the switching element to increase the output voltage when the detection voltage is smaller than a specific value, and to turn off the switching element to decrease the output voltage when the detection voltage is greater than the specific value. The detection voltage level shifting unit shifts the detection voltage so that the detection voltage during a voltage increasing period becomes greater than the detection voltage during a voltage decreasing period.

13 Claims, 10 Drawing Sheets

BOOST-TYPE SWITCHING REGULATOR AND SEMICONDUCTOR DEVICE FOR BOOST-TYPE SWITCHING REGULATOR

BACKGROUND OF THE INVENTION AND RELATED ART STATEMENT

The present invention relates to a boost-type switching regulator and a semiconductor device for the boost-type switching regulator.

A boost-type switching regulator includes a boost-type DC-DC converter (a boost converter) using a chopper method. When a direct current is input into the boost-type DC-DC converter, a switching element of the boost-type DC-DC converter divides the direct current into a pulse electrical current. Then, the boost-type DC-DC converter is configured to obtain a direct current having a required voltage through combining the pulse electrical current.

The boost-type DC-DC converter is formed of the switching element, an inductor (a choke coil), a capacitor, a diode, and a control circuit for controlling an on-off of the switching element. In general, the switching regulator has an advantage of a high power conversion ratio about 80-98%. Accordingly, when the switching regulator is used as a power conversion circuit, it is possible to reduce power consumption and an amount of heat generation.

Patent Reference 1 has disclosed a conventional switching regulator. The conventional switching regulator includes an error amplifier unit; a converter; a driving unit; and a clamp circuit.

Patent Reference 1: Japanese Patent Publication No. 2009-136064

In the conventional switching regulator disclosed in Patent Reference 1, the error amplifier unit is configured to compare an output voltage of the conventional switching regulator with a reference voltage, so that the error amplifier unit generates an error signal according to an error of the output voltage relative to the reference voltage. The converter is configured to compares the error signal transmitted from the error amplifier unit with a detection signal according to a coil electrical current flowing through an output inductor of the conventional switching regulator, so that the converter outputs an off signal having a specific level when a value of the detection signal reaches a value of the error signal.

Further, in the conventional switching regulator disclosed in Patent Reference 1, the driving unit is configured to turn off the switching element when the off signal becomes a specific level, and to turn on the switching element when a clock signal is changed to a specific level. The clamp circuit is configured to clamp the error signal transmitted from the error amplifier unit at a clamp value according to the output voltage of the conventional switching regulator.

Patent Reference 2 has disclosed a conventional direct current conversion circuit. The conventional direct current conversion circuit includes a microprocessor; an induction element; a transistor; a hysteresis comparator; and a logic circuit.

Patent Reference 2: Japanese Patent Publication No. 2012-10581

In the conventional direct current conversion circuit disclosed in Patent Reference 2, the hysteresis comparator is configured to compare an output signal of the conventional direct current conversion circuit with a first reference potential or a second reference potential. The logic circuit is configured to calculate an output signal of the hysteresis comparator and a clock signal of the microprocessor. The transistor is configured to control an electrical current flowing through the induction element according to an output signal of the logic circuit, so that the transistor generates the output signal of the conventional direct current conversion circuit according to an electrical current flowing through the induction element.

In the conventional boost-type switching regulator, there may be a control method, in which a duty of a gate signal for driving the switching element is fixed. In the control method, when the output voltage thus detected is smaller than a target voltage, the gate signal is supplied to the switching element. Further, when the output voltage thus detected is greater than the target voltage, the gate signal is not supplied to the switching element. With the control method, it is possible to reduce a circuit size as opposed to, for example, a PWM-type switching regulator, in which a pulse width of a gate signal is controlled according to an output voltage.

In general, regardless of the control method, the conventional switching regulator is configured to finely divide the direct current with the switching element. Accordingly, the output voltage of the conventional switching regulator tends to have a relatively large ripple. When the conventional boost-type switching regulator is operated in the control method, in which the duty of the gate signal is fixed, it may be configured such that a sufficient off period of the switching element is secured to reduce the ripple generated in the output voltage. However, in this case, it may be difficult to obtain the output voltage with a desired level, thereby making it difficult to reduce the ripple.

In view of the problems described above, an object of the present invention is to provide a boost-type switching regulator and a semiconductor device for the boost-type switching regulator capable of solving the problems of the conventional switching regulator. In the present invention, it is possible to reduce the ripple generated in the output voltage of the boost-type switching regulator.

Further objects and advantages of the invention will be apparent from the following description of the invention.

SUMMARY OF THE INVENTION

In order to attain the objects described above, according to a first aspect of the present invention, a boost-type switching regulator includes an inductor; a rectifying element; a capacitor; a switching element; an output terminal; a detection voltage generating unit; an output voltage controlling unit; and a detection voltage level shifting unit.

According to the first aspect of the present invention, the output terminal is configured to output an output voltage. The detection voltage generating unit is configured to generate a detection voltage according to a level of the output voltage output from the output terminal. The output voltage controlling unit is configured to turn on and turn off the switching element to increase the output voltage when a level of the detection voltage is smaller than a specific value. The output voltage controlling unit is configured to turn off the switching element to decrease the output voltage when the level of the detection voltage is greater than the specific value. The detection voltage level shifting unit is configured to shift the level of the detection voltage so that the level of the detection voltage during a voltage increasing period of the output voltage becomes greater than the level of the detection voltage during a voltage decreasing period of the output voltage.

According to a second aspect of the present invention, a boost-type switching regulator includes an inductor; a rectifying element; a capacitor; a switching element; an output terminal; a detection voltage generating unit; an output voltage controlling unit; and a reference voltage level shifting unit.

According to the second aspect of the present invention, the output terminal is configured to output an output voltage. The detection voltage generating unit is configured to generate a detection voltage according to a level of the output voltage output from the output terminal. The output voltage controlling unit is configured to turn on and turn off the switching element to increase the output voltage when a level of the detection voltage is smaller than a level of the reference voltage. The output voltage controlling unit is configured to turn off the switching element to decrease the output voltage when the level of the detection voltage is greater than the level of the reference voltage. The reference voltage level shifting unit is configured to shift the level of the detection voltage so that the level of the reference voltage during a voltage increasing period of the output voltage becomes smaller than the level of the reference voltage during a voltage decreasing period of the output voltage.

According to a third aspect of the present invention, a semiconductor device is for a boost-type switching regulator to be connected to an external component including an inductor; a rectifying element; a capacitor; a switching element; and an output terminal. The semiconductor device includes a first terminal connected to the output terminal; a second terminal connected to the switching element; a detection voltage generating unit connected to the first terminal; an output voltage controlling unit; and a detection voltage level shifting unit.

According to the third aspect of the present invention, the detection voltage generating unit is configured to generate a detection voltage according to a level of the output voltage output from the output terminal. The output voltage controlling unit is configured to turn on and turn off the switching element through supplying a pulse signal to the switching element through the second terminal to increase the output voltage when a level of the detection voltage is smaller than a specific value. The output voltage controlling unit is configured to turn off the switching element to decrease the output voltage when the level of the detection voltage is greater than the specific value. The detection voltage level shifting unit is configured to shift the level of the detection voltage so that the level of the detection voltage during a voltage increasing period of the output voltage becomes greater than the level of the detection voltage during a voltage decreasing period of the output voltage.

According to a fourth aspect of the present invention, a semiconductor device is for a boost-type switching regulator to be connected to an external component including an inductor; a rectifying element; a capacitor; a switching element; and an output terminal. The semiconductor device includes a first terminal connected to the output terminal; a second terminal connected to the switching element; a detection voltage generating unit connected to the first terminal; an output voltage controlling unit; and a reference voltage level shifting unit.

According to the fourth aspect of the present invention, the detection voltage generating unit is configured to generate a detection voltage according to a level of the output voltage output from the output terminal. The output voltage controlling unit is configured to turn on and turn off the switching element to increase the output voltage when a level of the detection voltage is smaller than a level of the reference voltage. The output voltage controlling unit is configured to turn off the switching element to decrease the output voltage when the level of the detection voltage is greater than the level of the reference voltage. The reference voltage level shifting unit is configured to shift the level of the detection voltage so that the level of the reference voltage during a voltage increasing period of the output voltage becomes smaller than the level of the reference voltage during a voltage decreasing period of the output voltage.

In the boost-type switching regulator and the semiconductor device for the boost-type switching regulator according to the present invention, it is possible to reduce the ripple generated in the output voltage of the boost-type switching regulator.

DETAILED DESCRIPTION OF PREFERRED EMBODIMENTS

Hereunder, preferred embodiments of the present invention will be explained with reference to the accompanying drawings.

Comparative Example

Figure 1:
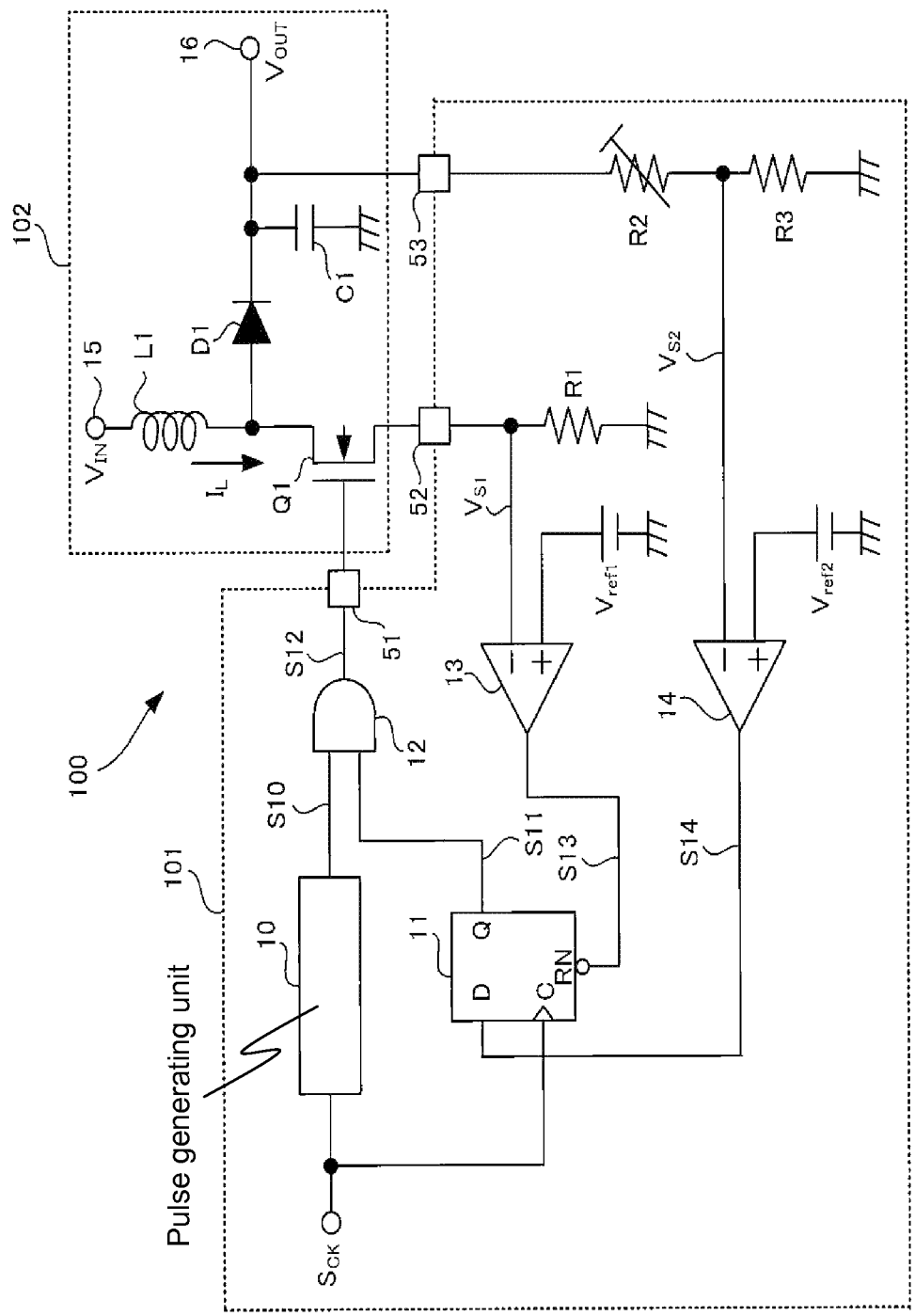
FIG. 1 is a schematic circuit diagram showing a configuration of a boost-type switching regulator according to a comparative example.

First, a boost-type switching regulator according to a comparative example will be explained before explaining the preferred embodiments of the present invention. FIG. 1 is a schematic circuit diagram showing a configuration of a boost-type switching regulator 100 (in the following description, also referred to as a regulator 100) according to the comparative example. The boost-type switching regulator 100 uses a fixed duty method, in which a gate signal having a constant duty is used.

As shown in FIG. 1, the boost-type switching regulator 100 is formed of a control circuit 101 and an output circuit 102. The control circuit 101 includes a pulse generating unit 10; a flip-flop 11; an AND gate 12; a first comparing unit 13; a second comparing unit 14; and resistor elements R1 to R3. The output circuit 102 includes a power source input terminal 15; an output terminal 16; a switching element Q1; an inductor (a choke coil) L1; a diode D1; and a capacitor C1.

In the comparative example, the control circuit 101 is formed as a semiconductor integrated circuit, and includes a first terminal 51 connected to an output terminal of the AND gate 12; a second terminal 52 connected to one end portion of the resistor element R1; and a third terminal 53 connected to one end portion of the resistor element R2. The components of the output circuit 102 are connected to the control circuit 101 formed as the semiconductor integrated circuit through the first terminal 51, the second terminal 52, and the third terminal 53. Accordingly, the control circuit 101 and the output circuit 102 constitute the boost-type switching regulator 100 for increasing an input voltage Vin supplied to the power source input terminal 15 to a target voltage VT, so that the target voltage VT is output as an output voltage Vout from the output terminal 16.

In the comparative example, the power source input terminal 15, to which the input voltage Vin is supplied, is connected to one end portion of the inductor L1. The other end portion of the inductor L1 is connected to a drain terminal of an NMOS transistor constituting the switching element Q1 and an anode terminal of the diode D1. A cathode terminal of the diode D1 is connected to the output terminal 16 and one end portion of the capacitor C1. The other end portion of the capacitor C1 is connected to a ground line.

In the comparative example, when the switching element Q1 is turned on, the inductor L1 stores energy. When the switching element Q1 is turned off, the inductor L1 releases energy thus stored, so that an induced electrical current is generated in a direction that impedes a change in an electrical current. When the induced electrical current flows in the capacitor C1 through the diode D1, the capacitor C1 is charged. Accordingly, during an off period of the switching element Q1, electric charges stored in the inductor L1 are transported to the capacitor C1.

In the comparative example, the resistor element R1 is provided as an electrical current detection resistor for converting an inductor electrical current IL flowing through the inductor L1 and the switching element Q1 to a voltage. The one end portion of the resistor element R1 is connected to a source terminal of the switching element Q1 through the second terminal 52, and the other end portion of the resistor element R1 is connected to the ground line. A voltage (referred to as a first detection voltage VS1) generated at a connecting point between the switching element Q1 and the resistor element R1 is connected to a non-inversion terminal of the first comparing unit 13.

In the comparative example, a first reference voltage Vref1 is supplied to the non-inversion terminal of the first comparing unit 13. The first comparing unit 13 is configured to output a first determination signal S13 with a low level when a level of the first detection voltage VS1 input into the non-inversion terminal of the first comparing unit 13 exceeds a level of the first reference voltage Vref1, so that the first determination signal S13 is supplied to a reset input terminal RN of the flip-flop 11.

In the comparative example, the resistor element R2 is connected to the resistor element R3 in series to form a voltage division circuit that is connected to the output terminal 16 through the third terminal 53. Accordingly, the output voltage Vout output from the output terminal 16 is divided according to a resistivity ratio of the resistor elements R2 and R3. A voltage (referred to as a second detection voltage VS2) corresponding to the output voltage Vout is drawn from a connecting point between the resistor elements R2 and R3, and is supplied to a non-inversion terminal of the second comparing unit 14.

In the comparative example, a second reference voltage Vref2 is supplied to the non-inversion terminal of the second comparing unit 14. The second comparing unit 14 is configured to output a second determination signal S14 with a low level when a level of the second detection voltage VS2 input into the non-inversion terminal of the second comparing unit 14 exceeds a level of the second reference voltage Vref2, so that the second determination signal S14 is supplied to a data input terminal D of the flip-flop 11. It should be noted that the resistor element R2 is formed as a variable resistor, so that it is possible to adjust the target value of the output voltage Vout through adjusting the resistivity value of the resistor element R2.

In the comparative example, the pulse generating unit 10 is configured to receive a reference clock signal SCK supplied from a clock signal generating unit (not shown). Further, the pulse generating unit 10 is configured to generate a pulse signal S10 having a specific duty synchronized with the reference clock signal SCK, so that the pulse generating unit 10 supplies the pulse signal S10 to a first input terminal of the AND gate 12. It should be noted that the reference clock signal SCK is supplied to a clock input terminal C of the flip-flop 11 as well.

In the comparative example, the flip-flop 11 is configured to receive the first determination signal S13 as a reset input, the second determination signal S14 as a data input, and the reference clock signal SCK as a clock input, so that the flip-flop 11 operates as a D flip-flop. Further, the flip-flop 11 is configured to maintain a signal level of the second determination signal S14 input into the data input terminal D thereof at a timing of rising of the reference clock signal SCK, so that the flip-flop 11 outputs the signal level thus maintained from the data output terminal Q thereof. Then, when the signal level of the first determination signal S13 input into a reset input terminal RN thereof becomes a low level, the flip-flop 11 is configured to reset an output value output from the data output terminal Q thereof (that is, the output value becomes the low level).

In other words, when the output voltage Vout of the boost-type switching regulator 100 exceeds the specific target voltage VT, or the inductor electrical current IL flowing through the inductor L1 and the switching element Q1 exceeds a specific over electrical current protection operation threshold vale IF (in the following description, also referred to as a threshold value IF), the flip-flop 11 is configured to output a gate control signal S11 having the low level from the data output terminal Q. Otherwise, the flip-flop 11 is configured to output the gate control signal S11 having the high level. Then, the gate control signal S11 is supplied to the second input terminal of the AND gate 12.

In the comparative example, the AND gate 12 is configured to calculate a logic product of the pulse signal S10 input into the first input terminal thereof from the pulse generating unit 10 and the gate control signal S11 input into the second input terminal thereof from the flip-flop 11, so that the AND gate 12 outputs the calculation result as a gate signal S12. The gate signal S12 is supplied to the gate terminal of the switching element Q1 through the first terminal 51.

Accordingly, in the comparative example, during a period of time when the gate control signal S11 output from the flip-flop 11 has the high level (that is, the output voltage Vout is below the target voltage VT, and the inductor electrical current IL flowing through the inductor L1 and the switching element Q1 is below the threshold value IF), the pulse signal S10 from the pulse generating unit 10 is supplied into the switching element Q1 as the gate signal S12. In this occasion, the switching element Q1 performs the on-off operation according to the signal level of the pulse signal S10 thus supplied. Accordingly, the output voltage Vout increases (the voltage increasing operation).

On the other hand, during a period of time when the gate control signal S11 output from the flip-flop 11 has the low level (that is, the output voltage Vout exceeds the target voltage VT, and the inductor electrical current IL flowing through the inductor L1 and the switching element Q1 exceeds the threshold value IF), the pulse signal S10 from the pulse generating unit 10 is stopped being supplied into the switching element Q1. In this occasion, the switching element Q1 stops the on-off operation according to the signal level of the pulse signal S10 thus supplied. Accordingly, the output voltage Vout decreases (the voltage decreasing operation). As described above, it is possible to control supplying or non-supplying of the pulse signal S10 into the switching element Q1 according to the gate control signal S11.

Figure 2:
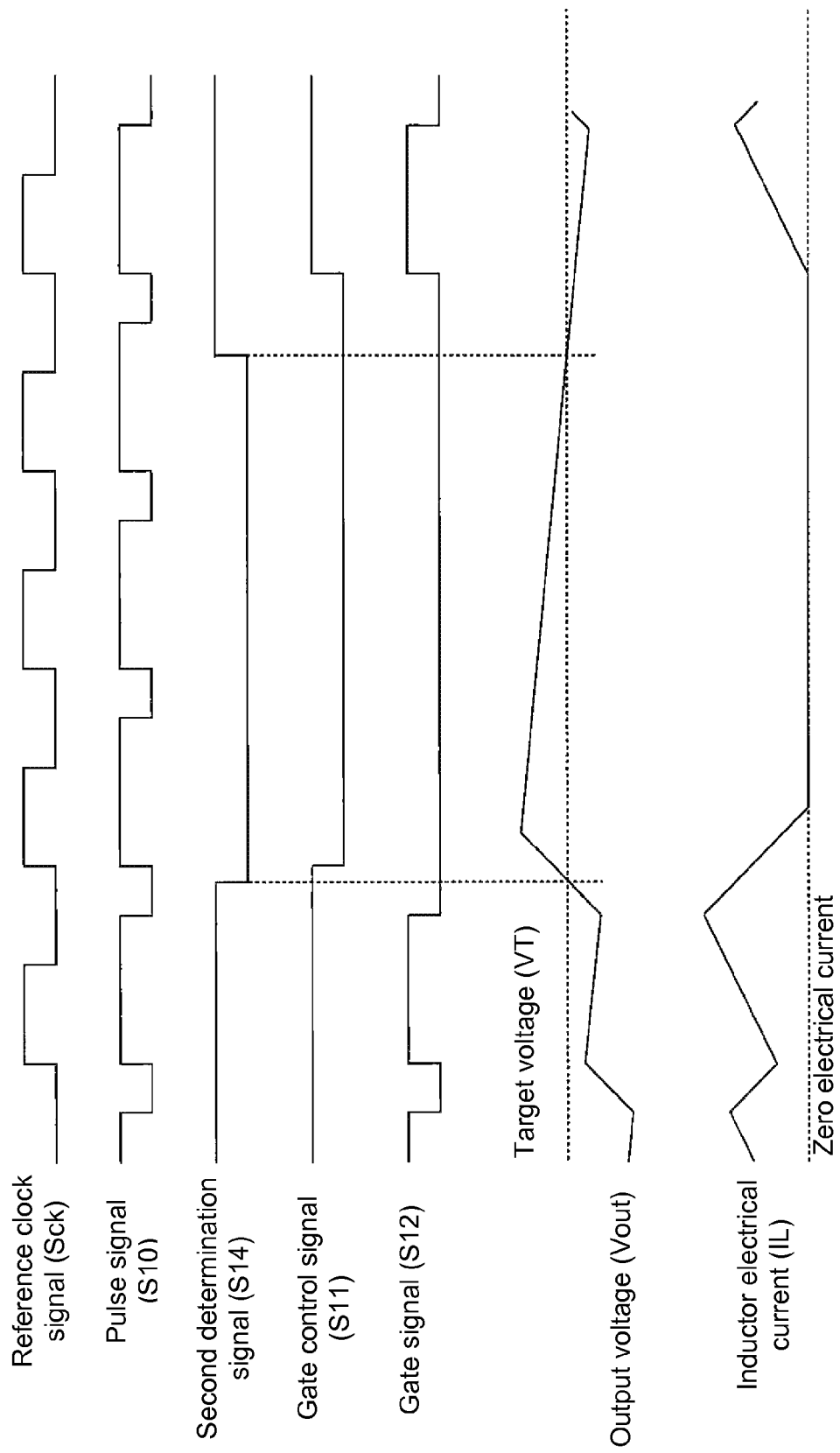
FIG. 2 is a time chart showing an operation of the boost-type switching regulator according to the comparative example.

An operation of the boost-type switching regulator 100 having the configuration described above will be explained next. FIG. 2 is a time chart showing the operation of the boost-type switching regulator 100 according to the comparative example.

In the operation of the boost-type switching regulator 100, when the reference clock signal SCK having a specific cycle is input into the pulse generating unit 10, the pulse generating unit 10 generates the pulse signal S10 having the constant duty and synchronizing with the reference clock signal SCK. During the period of time when the output voltage Vout output from the output terminal 16 of the pulse generating unit 10 is below the target voltage VT, the second determination signal S14 output from the second comparing unit 14 has the high level. Accordingly, unless the first comparing unit 13 detects an excessive electrical current, the gate control signal S11 has the high level, so that the pulse signal S10 is supplied into the switching element Q1 as the gate signal S12.

As a result, the switching element Q1 repeats being turned on and turned off according to the pulse signal S10, so that the inductor L1 repeats storing and releasing energy. The induced electrical current flowing from the inductor L1 flows into the capacitor C1, so that the capacitor C1 is charged. Accordingly, the output voltage Vout increases (the voltage increasing operation).

When the output voltage Vout reaches the target voltage VT, the second determination signal S14 output from the second comparing unit 14 becomes the low level. Accordingly, the gate control signal S11 becomes the low level, so that the pulse signal S10 is stopped being supplied into the switching element Q1. As a result, the switching element Q1 is turned off, so that the inductor L1 stops storing and releasing energy, and the output voltage Vout gradually decreases (the voltage decreasing operation).

When the output voltage Vout becomes below the target voltage VT, the switching element Q1 starts repeating being turned on and turned off, so that the output voltage Vout starts increasing again. As described above, the boost-type switching regulator 100 controls the pulse signal S10 having the constant duty to be supplied or not to be supplied according to the gate control signal S11, so that the output voltage Vout becomes closer to the target voltage VT.

Further, when the inductor electrical current IL flowing through the inductor L1 and the switching element Q1 exceeds the specific over electrical current protection operation threshold value IF, the first determination signal S13 output from the first comparing unit 13 becomes the low level. Accordingly, the gate control signal S11 becomes the low level, so that the pulse signal S10 is stopped being supplied into the switching element Q1. As a result, the switching element Q1 is turned off, so that it is possible to prevent the switching element Q1 from being overheated or damaged due to the excessive electrical current.

In the control method of the comparative example described above, however, the following problems may occur. That is, when the pulse signal S10 has a large on-duty, it may be difficult to transport a sufficient amount of electric charges from the inductor L1 to the capacitor C1 depending on the level of the input voltage Vin or a manufacturing variance of the switching element Q1. Under such a circumstance, if the on-off operation of the switching element Q1 is repeated, an amount of the electric charges stored in the inductor L1 may become larger than an amount of the electric charges released from the inductor L1. As a result, the inductor electrical current IL flowing through the inductor L1 and the switching element Q1 may be overlapped and become excessive, triggering the over electrical current protection function of the first comparing unit 13 so that the switching element Q1 becomes the off state. Accordingly, the electric charges stored in the inductor L1 flow into the capacitor C1 in a short period of time, thereby causing the ripple in the output voltage Vout.

In order to prevent the false operation of the over electrical current protection function, the duty of the pulse signal S10 may be reduced to secure the off period of the switching element Q1. However, when the duty of the pulse signal S10 is reduced, although it is possible to reduce the ripple, the output voltage Vout may not reach the target voltage VT.

In the boost-type switching regulator using the fixed duty method, a relationship between a voltage increasing ratio A (=output voltage Vout/input voltage Vin) and a duty ratio of the pulse signal S10 (=high level period/(high level period+ low level period)) can be expressed with the following equation:

$$A = 1/(1-D)$$

According to the equation, when it is desired to obtain the output voltage Vout ten times greater than the input voltage Vin, for example, it is possible to set the duty ratio D of the pulse signal S10 at about 90%. In other words, in the boost-type switching regulator using the fixed duty method, the voltage increasing ratio A is substantially determined by the duty ratio of the pulse signal S10. Accordingly, it is difficult to reduce the ripple while maintaining the output voltage Vout.

First Embodiment

Figure 3:
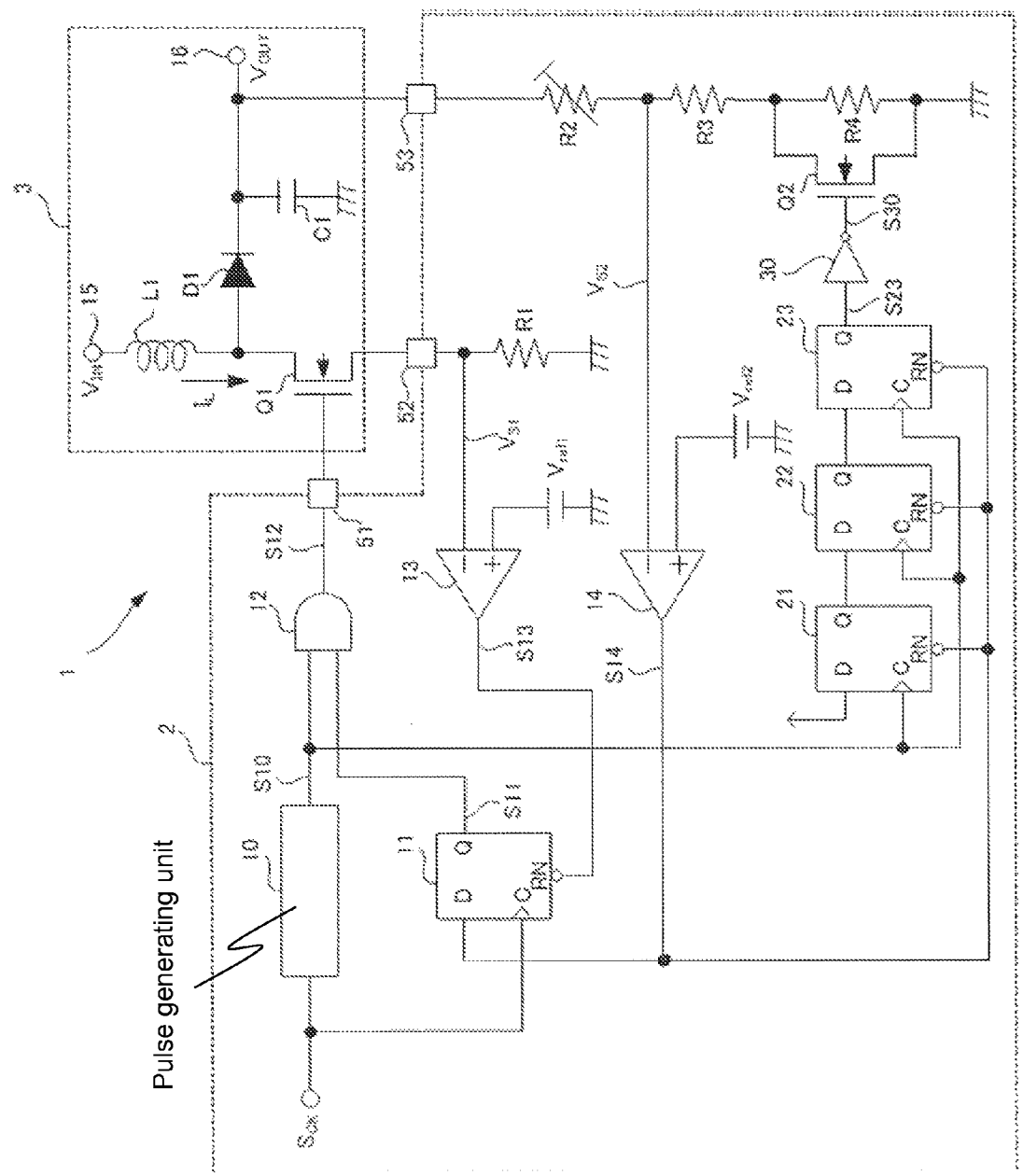
FIG. 3 is a schematic circuit diagram showing a configuration of a boost-type switching regulator according to a first embodiment of the present invention.

A first embodiment of the present invention will be explained. FIG. 3 is a schematic circuit diagram showing a configuration of a boost-type switching regulator 1 (in the following description, also referred to as a regulator 1) according to the first embodiment of the present invention. It should be noted that, in FIG. 3, components and signals of the boost-type switching regulator 1 similar to those of the boost-type switching regulator 100 of the comparative example are designated with the same numeral references.

As shown in FIG. 3, the boost-type switching regulator 1 is formed of a control circuit 2 and an output circuit 3. The control circuit 2 includes a pulse generating unit 10; a flip-flop 11 (in the following description, also referred to as an FF 11); an AND gate 12; a first comparing unit 13; a second comparing unit 14; resistor elements R1 to R4; a switching element Q2; a NOT gate 30; and flip-flops 21, 22, and 23 (in the following description, also referred to as an FF 21, and FF 22, and an FF 23). The flip-flops 21, 22, and 23 are configured to form a shift register having a three stage configuration. It should be noted that the control circuit 2 is formed as a semiconductor integrated circuit.

In the first embodiment, the output circuit 3 includes a power source input terminal 15; an output terminal 16; a switching element Q1; an inductor (a choke coil) L1; a diode D1; and a capacitor C1.

In the first embodiment, the control circuit 2 includes a first terminal 51 connected to an output terminal of the AND gate 12; a second terminal 52 connected to one end portion of the resistor element R1; and a third terminal 53 connected to one end portion of the resistor element R2. The components of the output circuit 3 are connected to the control circuit 2 formed as the semiconductor integrated circuit through the first terminal 51, the second terminal 52, and the third terminal 53. Accordingly, the control circuit 2 and the output circuit 3 constitute the boost-type switching regulator 1 for increasing an input voltage Vin supplied to the power source input terminal 15 to a target voltage VT, so that the target voltage VT is output as an output voltage Vout from the output terminal 16.

In the first embodiment, the power source input terminal 15, to which the input voltage Vin is supplied, is connected to one end portion of the inductor L1. The other end portion of the inductor L1 is connected to a drain terminal of an NMOS transistor constituting the switching element Q1 and an anode terminal of the diode D1. A cathode terminal of the diode D1 is connected to the output terminal 16 and one end portion of the capacitor C1. The other end portion of the capacitor C1 is connected to a ground line.

In the first embodiment, when the switching element Q1 is turned on, the inductor L1 stores energy. When the switching element Q1 is turned off, the inductor L1 releases energy thus stored, so that an induced electrical current is generated in a direction that impedes a change in an electrical current. When the induced electrical current flows in the capacitor C1 through the diode D1, the capacitor C1 is charged. Accordingly, during an off period of the switching element Q1, electric charges stored in the inductor L1 are transported to the capacitor C1.

In the first embodiment, the resistor element R1 is provided as an electrical current detection resistor for converting an inductor electrical current IL flowing through the inductor L1 and the switching element Q1 to a voltage. The one end portion of the resistor element R1 is connected to a source terminal of the switching element Q1 through the second terminal 52, and the other end portion of the resistor element R1 is connected to the ground line. A voltage generated at a connecting point between the switching element Q1 and the resistor element R1 is connected as a first detection voltage VS1 to a non-inversion terminal of the first comparing unit 13.

In the first embodiment, a first reference voltage Vref1 is supplied to the non-inversion terminal of the first comparing unit 13. The first comparing unit 13 is configured to output a first determination signal S13 with a low level when a level of the first detection voltage VS1 input into the non-inversion terminal of the first comparing unit 13 exceeds a level of the first reference voltage Vref1, so that the first determination signal S13 is supplied to a reset input terminal RN of the flip-flop 11.

In the first embodiment, the resistor elements R2 and R3 are connected to the resistor element R4 in series to form a voltage division circuit that is connected to the output terminal 16 through the third terminal 53. Accordingly, the output voltage Vout output from the output terminal 16 is divided according to a resistivity ratio of the resistor elements R2 to R4. A second detection voltage VS2 corresponding to the output voltage Vout is drawn from a connecting point between the resistor elements R2 and R3, and is supplied to a non-inversion terminal of the second comparing unit 14.

In the first embodiment, a second reference voltage Vref2 is supplied to the non-inversion terminal of the second comparing unit 14. The second comparing unit 14 is configured to output a second determination signal S14 with a low level when a level of the second detection voltage VS2 input into the non-inversion terminal of the second comparing unit 14 exceeds a level of the second reference voltage Vref2, so that the second determination signal S14 is supplied to a data input terminal D of the flip-flop 11. At the same time, the second determination signal S14 is supplied to reset terminals of the flip-flop 21, the flip-flop 22, and the flip-flop 23 constituting the shift register. It should be noted that the resistor element R2 is formed as a variable resistor, so that it is possible to adjust the target value of the output voltage Vout through adjusting the resistivity value of the resistor element R2. It should be also noted that the voltage division circuit formed of the resistor elements R2 to R4 corresponds to a detection voltage generating unit.

In the first embodiment, the pulse generating unit 10 is configured to receive a reference clock signal SCK supplied from a clock signal generating unit (not shown). Further, the pulse generating unit 10 is configured to generate a pulse signal S10 having a specific duty synchronized with the reference clock signal SCK, so that the pulse generating unit 10 supplies the pulse signal S10 to a first input terminal of the AND gate 12. It should be noted that the reference clock signal SCK is supplied to a clock input terminal C of the flip-flop 11 as well.

In the first embodiment, the flip-flop 11 is configured to receive the first determination signal S13 as a reset input, the second determination signal S14 as a data input, and the reference clock signal SCK as a clock input, so that the flip-flop 11 operates as a D flip-flop. Further, the flip-flop 11 is configured to maintain a signal level of the second determination signal S14 input into the data input terminal D thereof at a timing of rising of the reference clock signal SCK, so that the flip-flop 11 outputs the signal level thus maintained from the data output terminal Q thereof. Then, when the signal level of the first determination signal S13 input into a reset input terminal RN thereof becomes a low level, the flip-flop 11 is configured to reset an output value output from the data output terminal Q thereof (that is, the output value becomes the low level).

In other words, when the output voltage Vout of the boost-type switching regulator 1 exceeds the specific target voltage VT, or the inductor electrical current IL flowing through the inductor L1 and the switching element Q1 exceeds a specific over electrical current protection operation threshold vale IF (in the following description, also referred to as a threshold value IF), the flip-flop 11 is configured to output a gate control signal S11 having the low level from the data output terminal Q. Otherwise, the flip-flop 11 is configured to output the gate control signal S11 having the high level. Then, the gate control signal S11 is supplied to the second input terminal of the AND gate 12.

In the first embodiment, the AND gate 12 is configured to calculate a logic product of the pulse signal S10 input into the first input terminal thereof from the pulse generating unit 10 and the gate control signal S11 input into the second input terminal thereof from the flip-flop 11, so that the AND gate 12 outputs the calculation result as a gate signal S12. The gate signal S12 is supplied to the gate terminal of the switching element Q1 through the first terminal 51.

Accordingly, in the first embodiment, during a period of time when the gate control signal S11 output from the flip-flop 11 has the high level (that is, the output voltage Vout is below the target voltage VT, and the inductor electrical current IL flowing through the inductor L1 and the switching element Q1 is below the threshold value IF), the pulse signal S10 from the pulse generating unit 10 is supplied into the switching element Q1 as the gate signal S12. In this occasion, the switching element Q1 performs the on-off operation according to the signal level of the pulse signal S10 thus supplied. Accordingly, the output voltage Vout increases (the voltage increasing operation).

On the other hand, during a period of time when the gate control signal S11 output from the flip-flop 11 has the low level (that is, the output voltage Vout exceeds the target voltage VT, and the inductor electrical current IL flowing through the inductor L1 and the switching element Q1 exceeds the threshold value IF), the pulse signal S10 from the pulse generating unit 10 is stopped being supplied into the switching element Q1. In this occasion, the switching element Q1 stops the on-off operation according to the signal level of the pulse signal S10 thus supplied. Accordingly, the output voltage Vout decreases (the voltage decreasing operation). As described above, it is possible to control supplying or non-supplying of the pulse signal S10 into the switching element Q1 according to the gate control signal S11. It should be noted that the resistor elements R2 to R4, the second comparing unit 14, the flip-flop 11, and the AND gate 12 constitute an output voltage control unit. Further, the resistor element R1, the first comparing unit 13, the flip-flop 11, and the AND gate 12 constitute an over electrical current protection unit.

As described above, in the first embodiment, the boost-type switching regulator 1 includes the shift register formed of the three FFs, i.e., the flip-flop 21, the flip-flop 22, and the flip-flop 23, connected in the cascade connection. Further, it is configured such that the second determination signal S14 is input into the reset input terminals RN of the flip-flop 21, the flip-flop 22, and the flip-flop 23, respectively. Further, the pulse signal S10 generated with the pulse generating unit 10 is input into the clock input terminals C of the flip-flop 21, the flip-flop 22, and the flip-flop 23, respectively.

Further, in the first embodiment, the specific voltage level (for example, the power source voltage level) is input into the data input terminal D of the FF 21 at the first stage constituting the shift register. The output signal from the flip-flop 21 at the previous stage is input into the data input terminal D of the FF 22 at the second stage. The output signal from the flip-flop 22 at the second stage is input into the data input terminal D of the FF 23 at the final stage. The output signal from the flip-flop 23 at the final stage is output as a voltage increasing operation determination signal S23. After the NOT gate 30 inverts the voltage increasing operation determination signal S23, the voltage increasing operation determination signal S23 is supplied to the gate terminal of the switching element Q2.

In the first embodiment, the switching element Q2 is formed of an N-channel MOSFET that is configured to turn on when the voltage increasing operation determination signal S23 has the low level (that is, an output signal S30 of the NOT gate 30 has the high level), and turn off when the voltage increasing operation determination signal S23 has the high level (that is, the output signal S30 of the NOT gate 30 has the low level). Further, the switching element Q2 is connected in parallel to the resistor element R4 that is disposed between the resistor element R3 and the ground line.

More specifically, the drain terminal of the switching element Q2 is connected to the connection point between the resistor element R3 and the resistor element R4. The source terminal of the switching element Q2 is connected to the other one end portion of the resistor element R4, that is, the ground line. When the switching element Q2 is turned on, both end portions of the resistor element R4 are shortened. Accordingly, in the voltage division circuit formed of the resistor element R2, the resistor element R3, and the resistor element R4, the resistor element R4 is cancelled.

Figure 4:
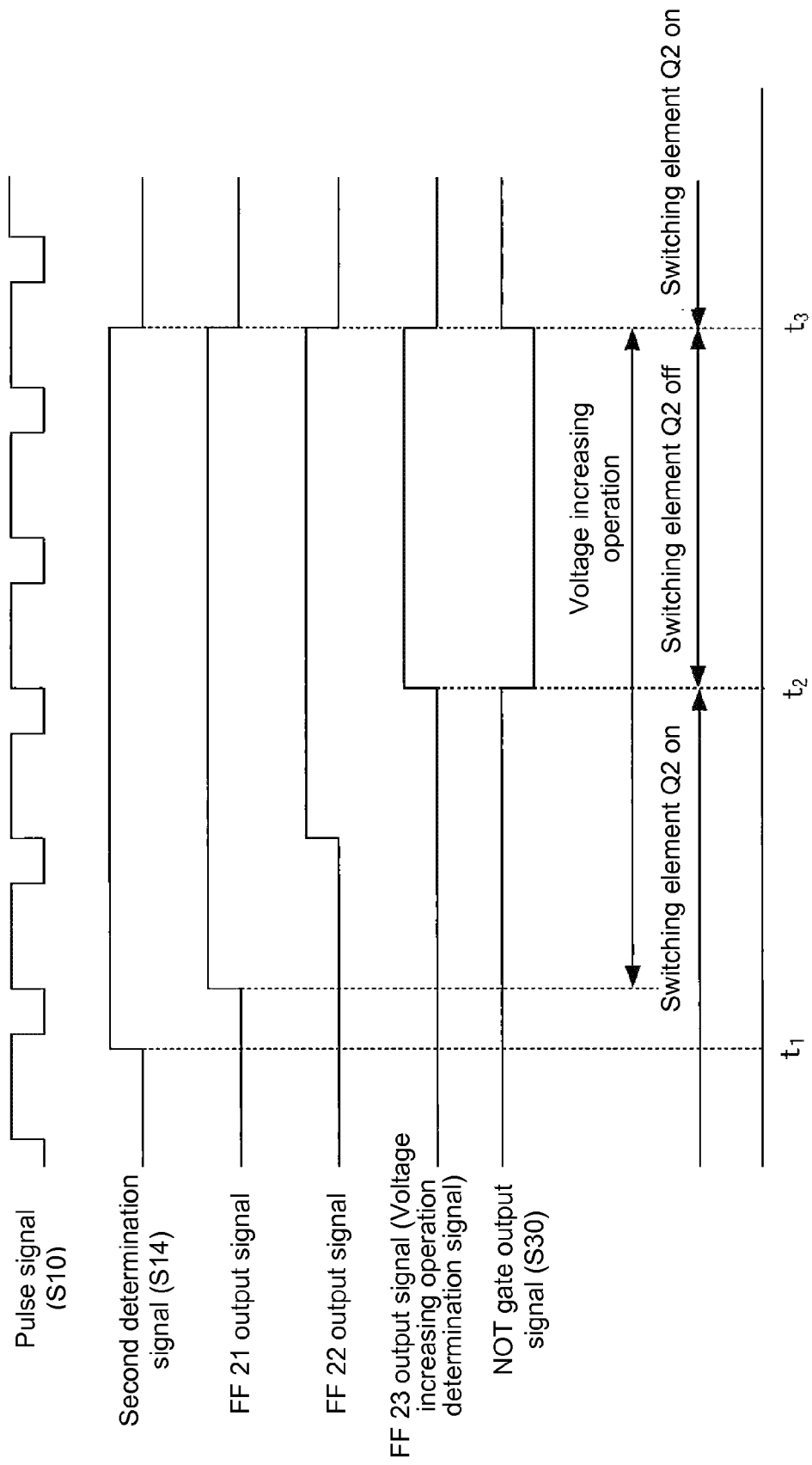
FIG. 4 is a time chart showing an operation of a shift register of the boost-type switching regulator according to the first embodiment of the present invention.

FIG. 4 is a time chart showing an operation of the shift register of the boost-type switching regulator 1 according to the first embodiment of the present invention. As described above, the shift register is formed of the flip-flop 21, the flip-flop 22, and the flip-flop 23.

As shown in FIG. 4, at a timing t1 when the output voltage Vout of the boost-type switching regulator 1 exceeds the target voltage VT, the second determination signal S14 output from the second comparing unit 14 becomes the high level. Afterward, the boost-type switching regulator 1 starts the voltage increasing operation. Further, when the second determination signal S14 becomes the high level, the flip-flop 21, the flip-flop 22, and the flip-flop 23 constituting the shift register are released from the reset state. Accordingly, the flip-flop 21, the flip-flop 22, and the flip-flop 23 sequentially output the output signal with the high level from the data output terminals Q thereof.

At a timing t2 when the pulse signal S10 generates the third rising edge counted from the point when the second determination signal S14 becomes the high level, the flip-flop 23 at the final stage outputs the voltage increasing operation determination signal S23 with the high level. At a timing t3 when the output voltage Vout of the boost-type switching regulator 1 becomes below the target voltage VT, the second determination signal S14 becomes the low level. When the second determination signal S14 becomes the low level, the flip-flop 21, the flip-flop 22, and the flip-flop 23 become the reset state. Accordingly, the flip-flop 21, the flip-flop 22, and the flip-flop 23 sequentially output the output signal with the low level. As a result, the flip-flop 23 at the final stage outputs the voltage increasing operation determination signal S23 with the high level over the period of time from the timing t2 to the timing t3 during the voltage increasing period.

As described above, after the boost-type switching regulator 1 is switched to the voltage increasing operation mode and the switching element Q1 repeats the on-off operation for a few times, the voltage increasing operation determination signal S23 becomes the high level. Afterward, the boost-type switching regulator 1 is switched to the voltage decreasing operation mode, the voltage increasing operation determination signal S23 becomes the low level. Accordingly, the voltage increasing operation determination signal S23 indicates that the boost-type switching regulator 1 is in the voltage increasing operation mode.

It should be noted that it is possible to adjust when the voltage increasing operation determination signal S23 becomes the high level at which number of the rising edge of the pulse signal S10 after the second determination signal S14 becomes the high level through adjusting the number of the stages of the flip-flops constituting the shift register. In the first embodiment, the shift register is formed of the flip-flops of the three stages. Alternatively, it may be possible to change the number of the stages of the flip-flops so as to adjust the timing when the voltage increasing operation determination signal S23 becomes the high level.

In the first embodiment, during the period of time when the voltage increasing operation determination signal S23 exhibits the high level, the output signal S30 with the low level is supplied to the gate terminal of the switching element Q2. In other words, the boost-type switching regulator 1 starts the voltage increasing operation, the switching element Q2 is turned off, so that the resistor element R4 functions as the part of the voltage division circuit. Accordingly, as opposed to the case that the switching element Q2 is turned off (during the voltage decreasing operation), the second detection voltage VS2 generated at the connection point between the resistor element R2 and the resistor element R3 has the higher level.

On the other hand, during the period of time when the voltage increasing operation determination signal S23 exhibits the low level, the both end portions of the resistor element R4 are shortened, so that the resistor element R4 is cancelled. Accordingly, as opposed to the case that the switching element Q2 is turned on (during the voltage increasing operation), the second detection voltage VS2 generated at the connection point between the resistor element R2 and the resistor element R3 has the lower level. It should be noted that the flip-flop 21, the flip-flop 22, the flip-flop 23, the NOT gate 30, and the switching element Q2 correspond to a detection voltage level shifting unit.

Figure 5:
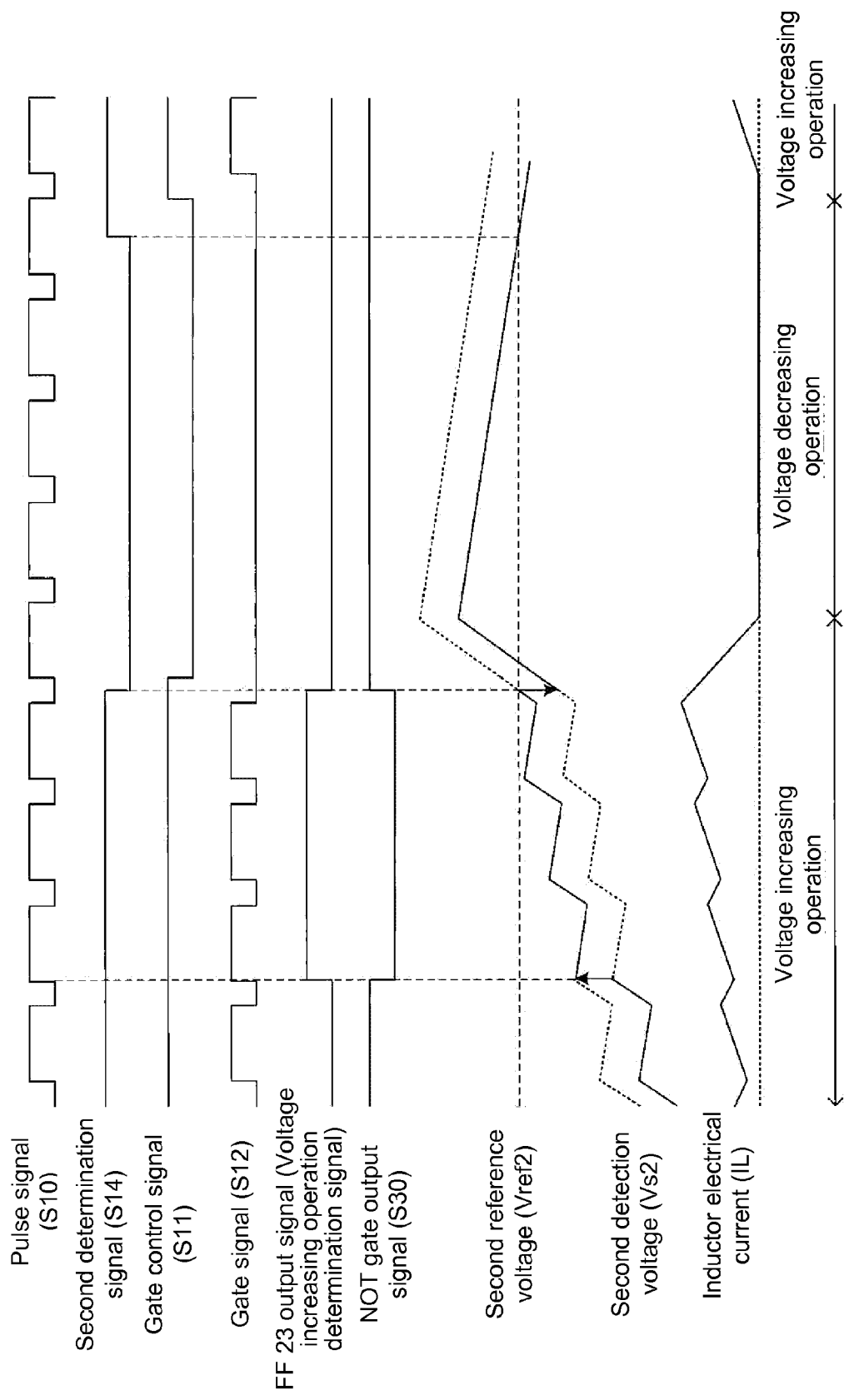
FIG. 5 is a time chart showing an operation of the boost-type switching regulator according to the first embodiment of the present invention.

FIG. 5 is a time chart showing an operation of the boost-type switching regulator 1 according to the first embodiment of the present invention.

As shown in FIG. 5, when the reference clock signal SCK with the specific cycle is input into the pulse generating unit 10, the pulse generating unit 10 generates the pulse signal S10 with the constant duty synchronized with the reference clock signal SCK. During the period of time when the output voltage Vout output from the output terminal 16 of the boost-type switching regulator 1 is below the target voltage VT, the second determination signal S14 output from the second comparing unit 14 has the high level. Accordingly, unless the first comparing unit 13 detects an excessive electrical current, the gate control signal S11 has the high level, so that the pulse signal S10 is supplied to the switching element Q1 as the gate signal S12.

As a result, the switching element Q1 repeats the on-off operation according to the pulse signal S10, so that the inductor L1 repeatedly accumulates and discharges energy. The induced electrical current discharged from the inductor L1 flows into the capacitor C1 through the diode D1, so that the capacitor C1 is charged. Accordingly, the output voltage Vout increases (the voltage increasing operation).

In the first embodiment, when the pulse signal S10 generates the third rising edge counted from the point when the voltage increasing operation is started, the flip-flop 23 at the final stage constituting the shift register outputs the voltage increasing operation determination signal S23 with the high level. Accordingly, the output signal S30 with the low level is supplied to the gate terminal of the switching element Q2 through the NOT gate 30. As a result, the switching element Q2 is switched from the on state to the off state. When the switching element Q2 becomes the off state, the resistor element R4 functions as the part of the voltage division circuit. Accordingly, as shown in FIG. 5, the second detection voltage VS2 generated at the connection point between the resistor element R2 and the resistor element R3 is level-shifted toward the higher voltage side. In other words, in the boost-type switching regulator 1, when the voltage increasing operation is started, the detection level of the output voltage Vout supplied to the non-inversion terminal of the second comparing unit 14 increases.

Afterward, the voltage increasing operation is continued, and when the level of the second detection voltage VS2 level-shifted to the higher voltage side reaches the level of the second reference voltage Vref2, the second determination signal S14 output from the second comparing unit 14 becomes the low level. As a result, the gate control signal S11 becomes the low level, so that the pulse generating unit 10 is stopped being supplied to the switching element Q1. Accordingly, the switching element Q1 becomes the off state, and the inductor L1 stops accumulating energy, so that the output voltage Vout gradually decreases (the voltage decreasing operation).

As described above, in the first embodiment, the second detection voltage VS2 is level-shifted to the higher voltage side during the voltage increasing period. Accordingly, it is possible to switch to the voltage decreasing operation at the earlier stage. Accordingly, it is possible to release energy accumulated in the inductor L1 at the earlier stage, thereby making it possible to reduce the ripple generated in the output voltage Vout.

In the first embodiment, when the second determination signal S14 becomes the low level, the flip-flop 21, the flip-flop 22, and the flip-flop 23 constituting the shift register become the reset state. As a result, the voltage increasing operation determination signal S23 output from the flip-flop 23 at the final stage becomes the low level. Accordingly, the output signal S30 with the high level is supplied to the gate terminal of the switching element Q2 through the NOT gate 30, so that the switching element Q2 is switched from the off state to the on state. When the switching element Q2 becomes the on state, the resistor element R4 is cancelled. As a result, the level of the second detection voltage VS2 generated at the connection point between the resistor element R2 and the resistor element R3 is shifted toward the lower voltage side as shown in FIG. 5. In other words, when the boost-type switching regulator 1 starts the voltage decreasing operation, the detection level of the output voltage Vout supplied to the non-inversion terminal of the second comparing unit 14 decreases.

Afterward, when the level of the second detection voltage VS2 level-shifted to the lower voltage side becomes below the level of the second reference voltage Vref2, the second determination signal S14 output from the second comparing unit 14 becomes the high level. As a result, the gate control signal S11 becomes the high level. Accordingly, the switching element Q1 resumes the on-off operation, so that the output voltage Vout starts increasing. Through the operation described above, the boost-type switching regulator 1 is configured to control the supply and the non-supply of the pulse signal S10 with the constant duty through the gate control signal S11 according to the output voltage Vout. Accordingly, it is possible to adjust the output voltage Vout toward the target voltage VT.

Further, when the inductor electrical current IL flowing through the inductor L1 and the switching element Q1 exceeds the specific over electrical current protection operation threshold value IF, the first determination signal S13 output from the first comparing unit 13 becomes the low level. Accordingly, the gate control signal S11 becomes the low level, so that the pulse signal S10 is stopped being supplied into the switching element Q1. As a result, the switching element Q1 is turned off, so that it is possible to prevent the switching element Q1 from being overheated or damaged due to the excessive electrical current.

In the boost-type switching regulator 1 in the first embodiment, similar to the boost-type switching regulator 100 of the comparative example described above, when the pulse signal S10 has the large on-duty, it may be difficult to transport a sufficient amount of electric charges from the inductor L1 to the capacitor C1 depending on the level of the input voltage Vin or a manufacturing variance of the switching element Q1. Under such a circumstance, if the on-off operation of the switching element Q1 is repeated, an amount of the electric charges stored in the inductor L1 may become larger than an amount of the electric charges released from the inductor L1. As a result, the inductor electrical current IL flowing through the inductor L1 and the switching element Q1 may be overlapped and become excessive.

To this end, in the boost-type switching regulator 1 in the first embodiment, the shift register formed of the flip-flop 21, the flip-flop 22, and the flip-flop 23 is provided for determining whether the voltage increasing operation is started. When the flip-flop 21, the flip-flop 22, and the flip-flop 23 determine that the voltage increasing operation is started, the switching element Q2 is turned off, so that the resistor element R4 effectively functions as the voltage division resistor. Accordingly, the level of the second detection voltage VS2 generated at the connection point between the resistor element R2 and the resistor element R3 is shifted to the higher voltage side. As a result, during the voltage increasing period, the second detection voltage VS2 reaches the second reference voltage Vref2 at the earlier stage. Accordingly, it is possible to switch to the voltage decreasing operation at the earlier stage. Accordingly, it is possible to release energy accumulated in the inductor L1 at the earlier stage. Therefore, it is possible to prevent the first comparing unit 13 from starting the over electrical current protection function, thereby making it possible to reduce the ripple generated in the output voltage Vout.

In the first embodiment, after the boost-type switching regulator 1 is switched to the voltage decreasing operation, the switching element Q2 becomes the on state, and the resistor element R4 is cancelled. As a result, the level of the second detection voltage VS2 generated at the connection point between the resistor element R2 and the resistor element R3 is shifted toward the lower voltage side. Accordingly, during the voltage increasing period, even when the second detection voltage VS2 is shifted toward the higher voltage side, it is possible to adjust the output voltage Vout toward the target voltage VT.

Further, in the boost-type switching regulator 1 in the first embodiment, the shift register formed of the flip-flop 21, the flip-flop 22, and the flip-flop 23 is provided for determining whether the voltage increasing operation is started when the switching element Q1 repeats the on-off operation for a plurality of times. Accordingly, it is possible to securely determine whether the voltage increasing operation is started. It should be noted that the shift register is formed of the flip-flop 21, the flip-flop 22, and the flip-flop 23 at the three stages. Alternatively, the shift register may be formed of more than or less than three stages of the flip-flops so as to increase or decrease the pulse number of the pulse signal S10 for determining the voltage increasing operation.

Figure 6A:
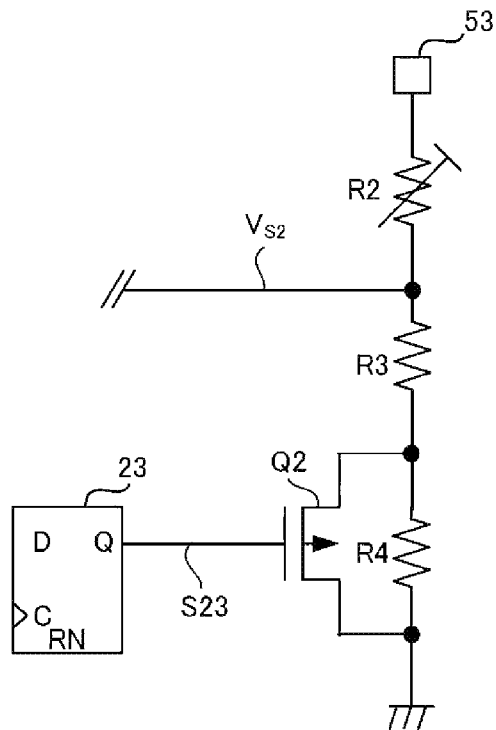
FIGS. 6(a) to 6(c) are schematic circuit diagrams showing partial configurations of the boost-type switching regulator according to the first embodiment of the present invention.
Figure 6B:
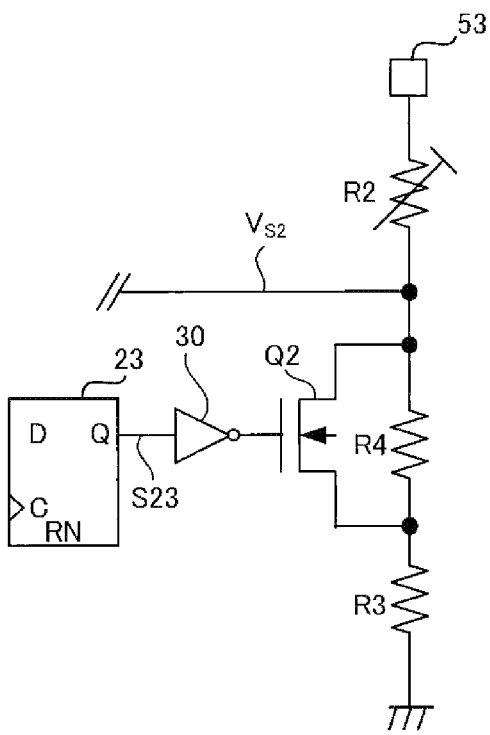
Figure 6C:
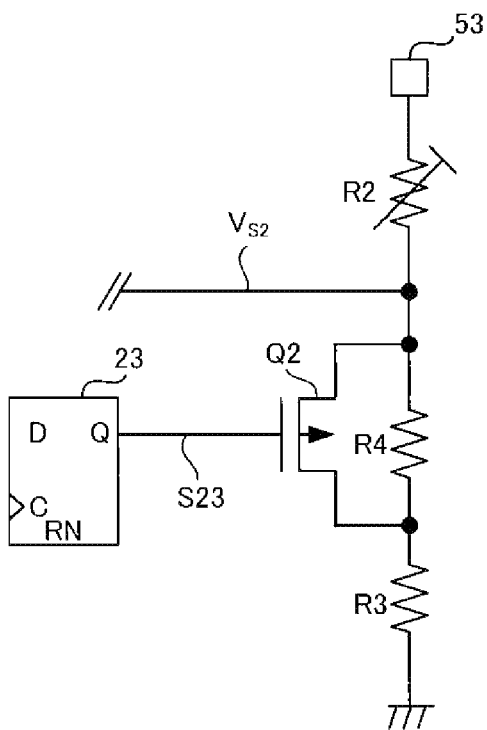

FIGS. 6(a) to 6(c) are schematic circuit diagrams showing partial configurations of the boost-type switching regulator 1 according to the first embodiment of the present invention. FIGS. 7(a) to 7(d) are schematic circuit diagrams showing partial configurations of the boost-type switching regulator 1 according to the first embodiment of the present invention. As shown in FIGS. 6(a)-6(c) and 7(a)-7(d), it is possible to modify the configuration of the boost-type switching regulator 1 so as to shift the level of the second detection voltage VS2 toward the higher voltage side during the voltage increasing period.

As shown in FIG. 6(a), the switching element Q2 may be formed of a P-channel MOSFET. In this case, it is not necessary to dispose the NOT gate 30 between the switching element Q2 and the FF 23 at the final stage constituting the shift register.

As shown in FIGS. 6(b) and 6(c), the resistor element R4 connected to the switching element Q2 in parallel may be disposed between the resistor element R2 and the resistor element R3. Further, the second detection voltage VS2 is drawn as the voltage at the connection point between the resistor element R2 and the resistor element R4. In this case, as shown in FIG. 6(b), the switching element Q2 may be formed of an N-channel MOSFET. When the switching element Q2 is formed of the N-channel MOSFET, the NOT gate 30 is disposed between the FF23 and the switching element Q2. Alternatively, as shown in FIG. 6(c), the switching element Q2 may be formed of the P-channel MOSFET. When the switching element Q2 is formed of the P-channel MOSFET, it is not necessary to dispose the NOT gate 30 between the switching element Q2 and the FF 23.

Figure 7A:
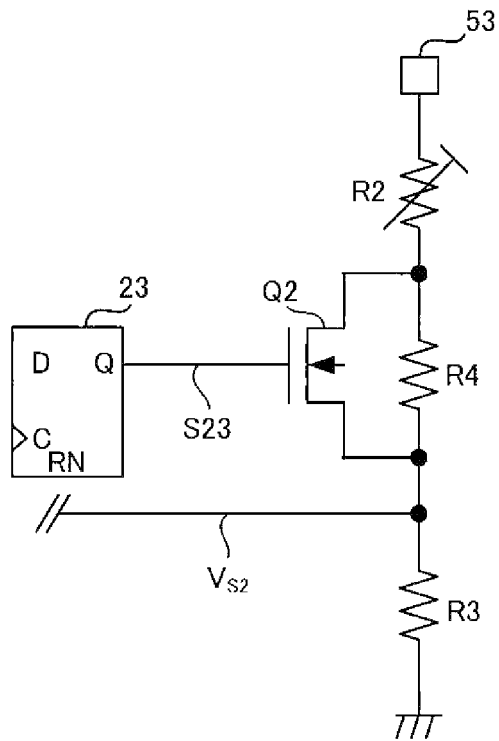
FIGS. 7(a) to 7(d) are schematic circuit diagrams showing partial configurations of the boost-type switching regulator according to the first embodiment of the present invention.
Figure 7B:
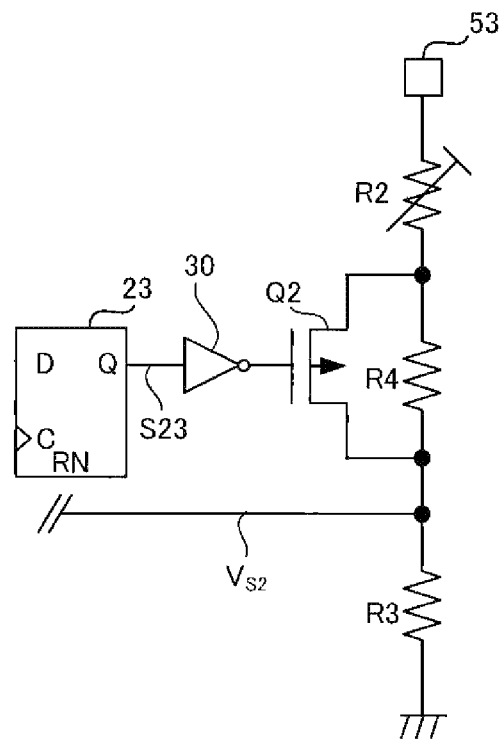

As shown in FIGS. 7(a) and 7(b), the resistor element R4 connected to the switching element Q2 in parallel may be disposed between the resistor element R2 and the resistor element R3. Further, the second detection voltage VS2 is drawn as the voltage at the connection point between the resistor element R3 and the resistor element R4. In this case, as shown in FIG. 7(a), the switching element Q2 may be formed of the N-channel MOSFET. When the switching element Q2 is formed of the N-channel MOSFET, it is not necessary to dispose the NOT gate 30 between the switching element Q2 and the FF 23. Alternatively, as shown in FIG. 7(b), the switching element Q2 may be formed of the P-channel MOSFET. When the switching element Q2 is formed of the P-channel MOSFET, the NOT gate 30 is disposed between the FF23 and the switching element Q2.

Figure 7C:
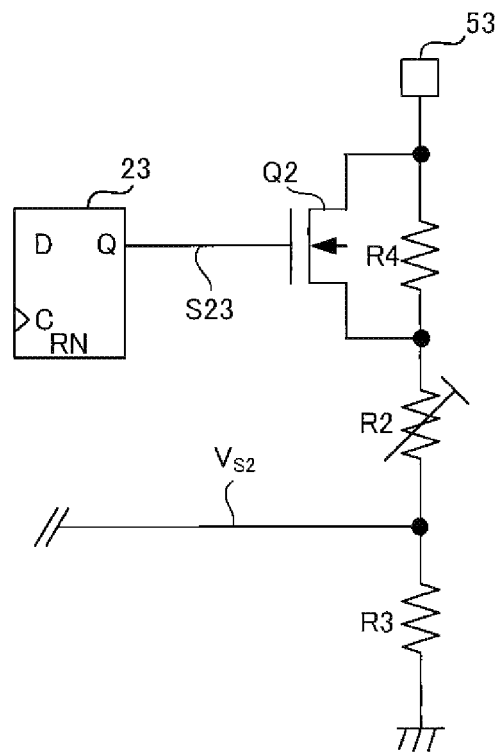
Figure 7D:
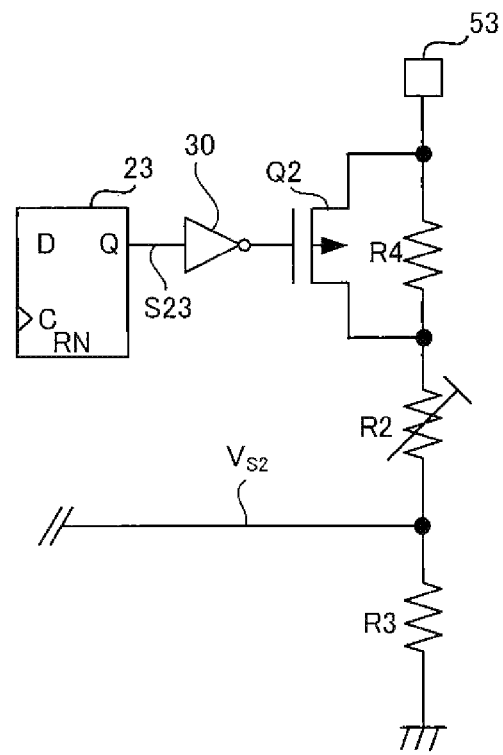

Further, as shown in FIGS. 7(c) and 7(d), the resistor element R4 connected to the switching element Q2 in parallel may be disposed between the resistor element R2 and the third terminal 53 connected to the output terminal 16. Further, the second detection voltage VS2 is drawn as the voltage at the connection point between the resistor element R2 and the resistor element R3. In this case, as shown in FIG. 7(c), the switching element Q2 may be formed of the N-channel MOSFET. When the switching element Q2 is formed of the N-channel MOSFET, it is not necessary to dispose the NOT gate 30 between the switching element Q2 and the FF 23. Alternatively, as shown in FIG. 7(d), the switching element Q2 may be formed of the P-channel MOSFET. When the switching element Q2 is formed of the P-channel MOSFET, the NOT gate 30 is disposed between the FF23 and the switching element Q2.

In the first embodiment, the switching element Q2 is connected to the resistor element R4 in parallel, and performs the on-off operation, so that the level of the second detection voltage VS2 is shifted. Alternatively, the resistor element R4 may be formed of a variable resistor. In this case, the resistivity value of the resistor element R4 is adjusted according to the voltage increasing operation determination signal S23, so that the level of the second detection voltage VS2 is shifted. Further, one of two resistor elements having different resistivity values may be selectively disposed between the resistor element R3 and the ground line according to the voltage increasing operation determination signal S23, so that the level of the second detection voltage VS2 is shifted.

Second Embodiment

Figure 8:
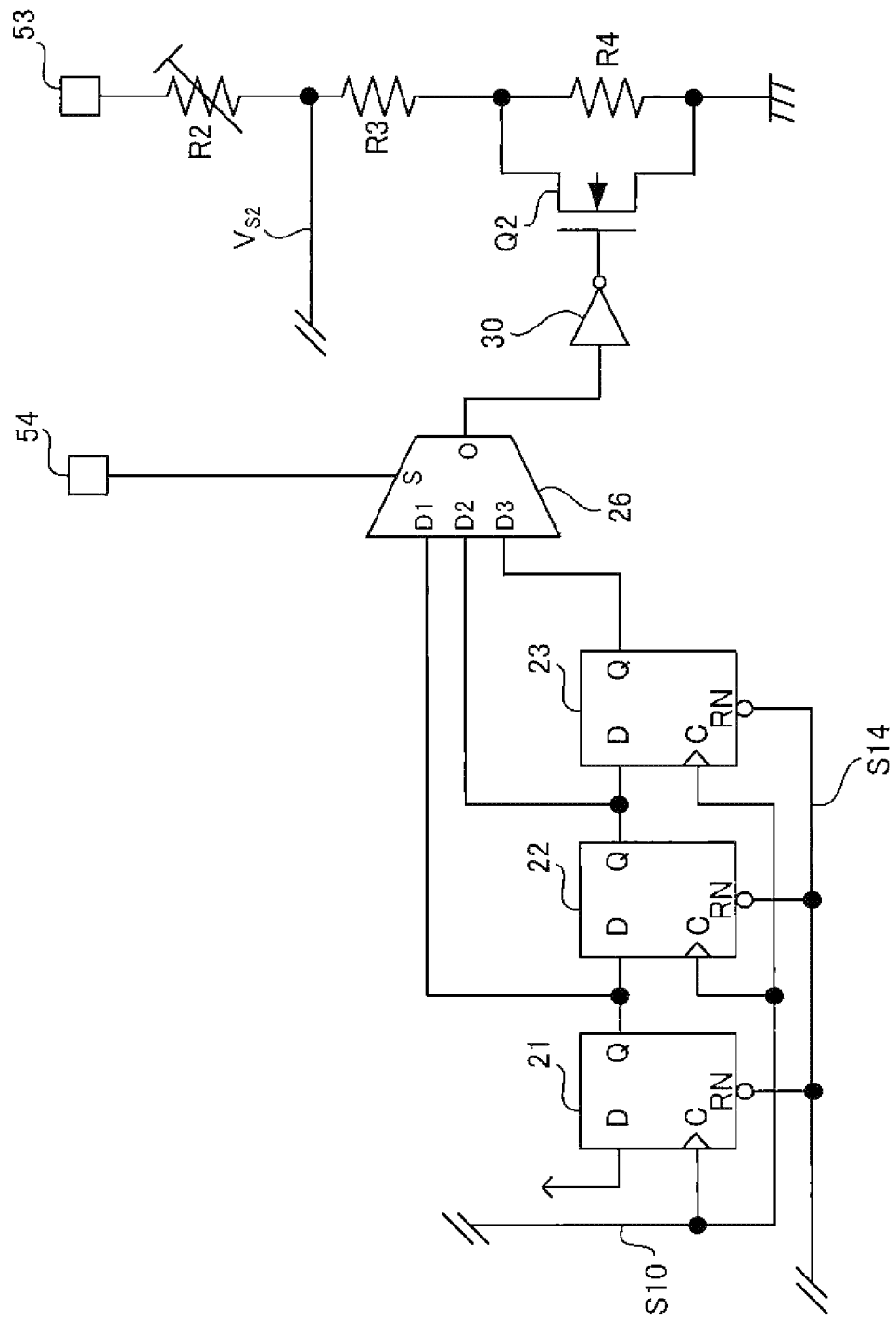
FIG. 8 is a schematic circuit diagram showing a partial configuration of a boost-type switching regulator according to a second embodiment of the present invention.

A second embodiment of the present invention will be explained next with reference to FIG. 8. FIG. 8 is a schematic circuit diagram showing a partial configuration of the boost-type switching regulator 1 according to the second embodiment of the present invention.

In the first embodiment, the boost-type switching regulator 1 is configured such that the second detection voltage VS2 is level-shifted toward the higher voltage side when the pulse number of the pulse signal S10 generated after the boost-type switching regulator 1 is switched to the voltage increasing operation becomes the specific number. In other words, as the condition for level-shifting the second detection voltage VS2 level-shifted toward the higher voltage side, the pulse number of the pulse signal S10 generated after the boost-type switching regulator 1 is switched to the voltage increasing operation is fixed.

On the other hand, in the second embodiment, as the condition for level-shifting the second detection voltage VS2 level-shifted toward the higher voltage side, the pulse number of the pulse signal S10 generated after the boost-type switching regulator 1 is switched to the voltage increasing operation is variable. In other words, the timing when the second detection voltage VS2 is level-shifted toward the higher voltage side is variable. It should be noted that only the configuration for level-shifting the second detection voltage VS2 is shown in FIG. 8. Other components of the boost-type switching regulator 1 in the second embodiment are similar to those of the boost-type switching regulator 1 in the first embodiment.

As shown in FIG. 8, the boost-type switching regulator 1 in the second embodiment is provided with a selector 26 for selecting one of the output signals of the flip-flop 21, the flip-flop 22, and the flip-flop 23 constituting the shift register. The selector 26 includes data input terminals D1, D2, and D3 connected to the data output terminals Q of the flip-flop 21, the flip-flop 22, and the flip-flop 23, respectively. Further, the selector 26 includes a selection signal input terminal S connected to a fourth terminal 54 for receiving a selection signal supplied from outside. Further, the selector 26 includes an output terminal O for selecting and outputting and one of the signals input into the data input terminals D1, D2, and D3 according to the selection signal input into the selection signal input terminal S. The output signal output from the output terminal O of the selector 26 is supplied to the switching element Q2 through the NOT gate 30.

With the configuration described above, the selection signal is supplied from outside through the fourth terminal 54. Accordingly, it is possible to supply one of the signals output from the flip-flop 21, the flip-flop 22, and the flip-flop 23 that is selected by a user to the switching element Q2. As a result, the user can select the timing when the second detection voltage VS2 starts being level-shifted toward the higher voltage side. Therefore, it is possible to adjust the timing when the second detection voltage VS2 starts being level-shifted toward the higher voltage side so as to obtain a desired result while confirming an operation on an actual device.

It should be noted that, in the second embodiment, the shift resister is formed of the flip-flop 21, the flip-flop 22, and the flip-flop 23 at the three stages. Alternatively, the shift register may be formed of the flip-flops at more than or less than three stages. When the number of the stages of the shift register increases, it is possible to adjust the timing of the level-shift of the second detection voltage VS2 within a wider range.

Third Embodiment

Figure 9:
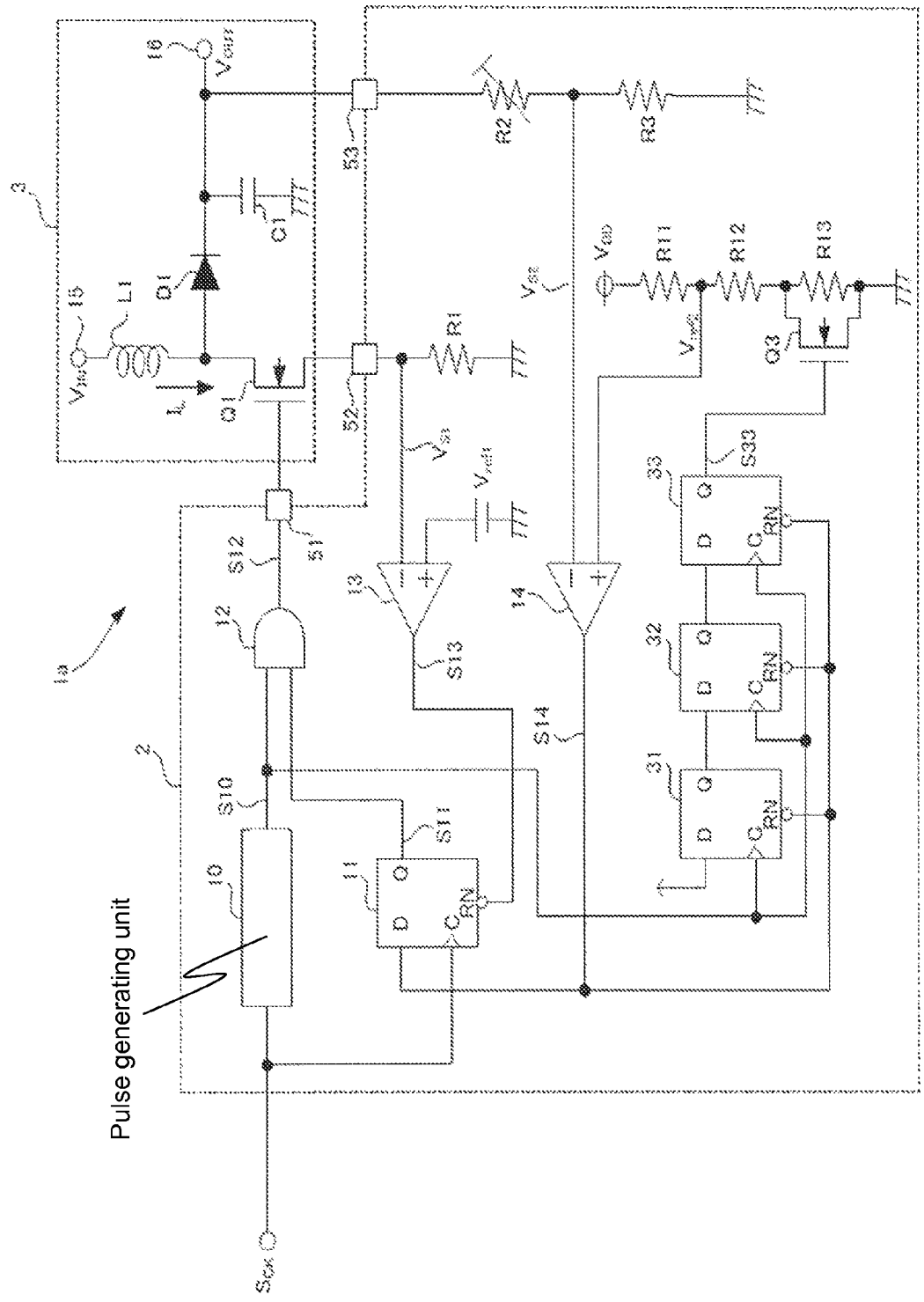
FIG. 9 is a schematic circuit diagram showing a configuration of a boost-type switching regulator according to a third embodiment of the present invention.

A third embodiment of the present invention will be explained next with reference to FIG. 9. FIG. 9 is a schematic circuit diagram showing a configuration of a boost-type switching regulator 1a (in the following description, also referred to as a regulator 1a) according to the third embodiment of the present invention.

In the first embodiment, the boost-type switching regulator 1 is configured such that, during the voltage increasing period, the level of the second detection voltage VS2 is level-shifted toward the higher voltage side according to the level of the output voltage Vout, thereby making it possible to switch to the voltage decreasing operation.

In the third embodiment, the boost-type switching regulator 1a is configured such that, during the voltage increasing period, the level of the second reference voltage Vref2 supplied to the non-inversion input terminal of the second comparing unit 14 is level-shifted toward the lower voltage side, thereby making it possible to change to the voltage decreasing operation. Features in the third embodiment different from those in the first embodiment will be explained below.

In the third embodiment, a voltage division circuit formed of resistor elements R11, R12, and R13 is disposed between, for example, the power source line VDD and the ground line for generating the second reference voltage Vref2 supplied to the non-inversion input terminal of the second comparing unit 14. More specifically, the voltage at the connection point between the resistor elements R11 and R12 is drawn as the second reference voltage Vref2 and supplied to the non-inversion input terminal of the second comparing unit 14.

In the third embodiment, the boost-type switching regulator 1a includes a shift register that is formed of three flip-flops 31, 32, and 33 (in the following description, also referred to as an FF 31, an FF 32, and an FF 33) connected in a cascade connection. The second determination signal S14 output from the second comparing unit 14 is supplied to the reset input terminals RN of the flip-flop 31, the flip-flop 32, and the flip-flop 33, respectively. The pulse signal S10 output from the pulse generating unit 10 is supplied to the clock input terminals C of the flip-flop 31, the flip-flop 32, and the flip-flop 33, respectively.

In the third embodiment, a specific voltage level (for example, the power source voltage level) is supplied to the data input terminal D of the FF31 at the first stage constituting the shift register. An output signal from the FF 31 at the first stage is supplied to the data input terminal D of the FF 32 at the second stage. An output signal from the FF 32 at the second stage is supplied to the data input terminal D of the FF 33 at the final stage. An output signal from the FF 32 at the final stage is supplied as a voltage increasing operation determination signal S33 to the gate terminal of a switching element Q3.

In the third embodiment, the switching element Q3 is formed of an N-channel MOSFET that is configured to turn on when the voltage increasing operation determination signal S33 has the high level, and turn off when the voltage increasing operation determination signal S33 has the low level. Further, the switching element Q3 is connected in parallel to the resistor element R3. More specifically, a drain terminal of the switching element Q3 is connected to the connection point between the resistor element R12 and the resistor element R13. A source terminal of the switching element Q3 is connected to the other end portion of the resistor element R13, that is, the ground line. That is, when the switching element Q3 is turned on, both end portions of the resistor element R13 are shortened, so that the resistor element R13 is cancelled in the voltage division circuit formed of the resistor elements R11, R12, and R13.

In the third embodiment, an operation of the shift register formed of the flip-flop 31, the flip-flop 32, and the flip-flop 33 is similar to that of the shift register in the first embodiment. Further, the switching element Q3 performs the on-off operation opposite to the on-off operation of the switching element Q2 in the first embodiment. It should be noted that the boost-type switching regulator 1 does not include the flip-flop 21, the flip-flop 22, the flip-flop 23, the NOT gate 30, the switching element Q2, and the resistor element R4 of the boost-type switching regulator 1 in the first embodiment.

Figure 10:
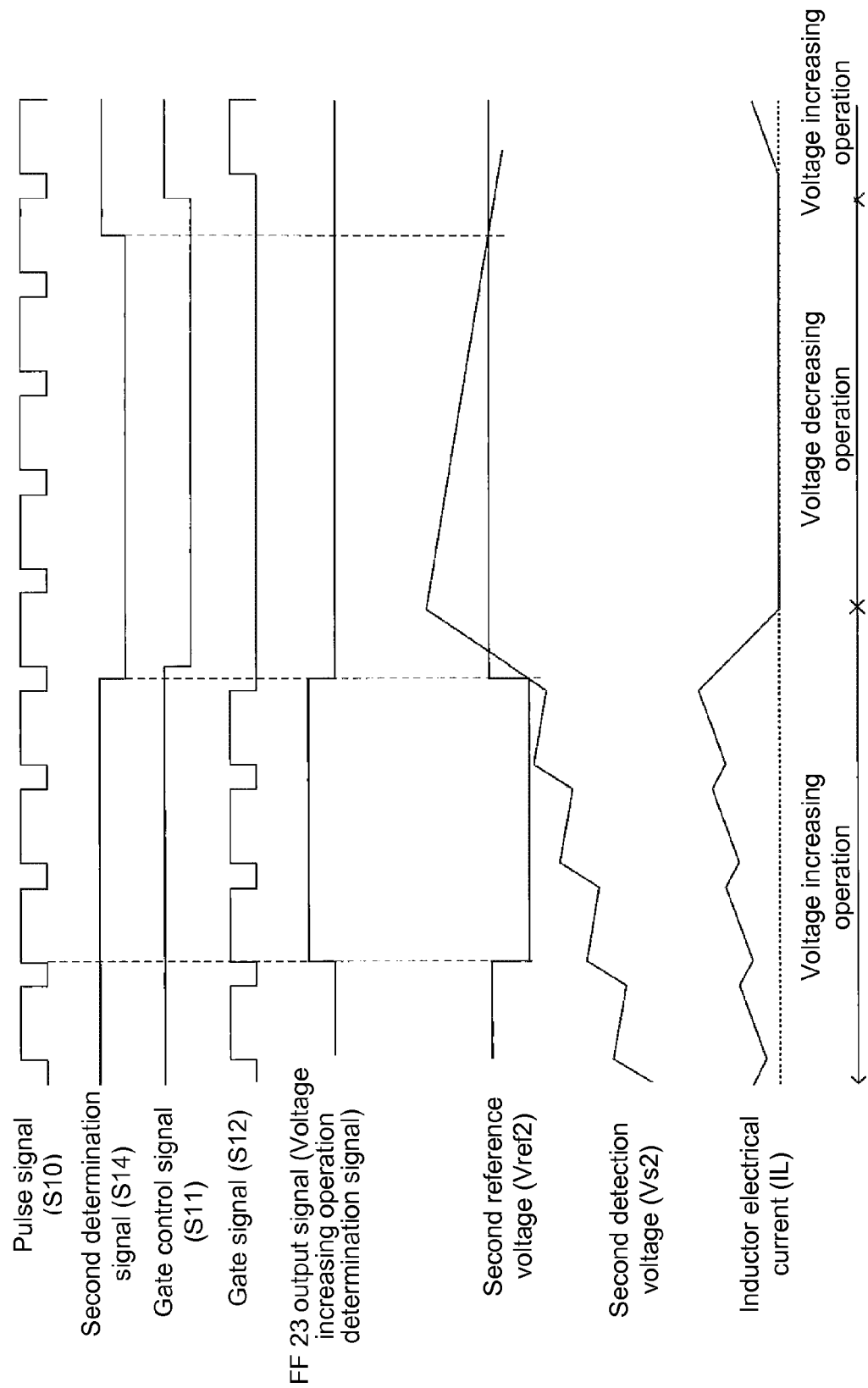
FIG. 10 is a time chart showing an operation of the boost-type switching regulator according to the third embodiment of the present invention.

FIG. 10 is a time chart showing an operation of the boost-type switching regulator 1a according to the third embodiment of the present invention.

As shown in FIG. 10, when the reference clock signal SCK with the specific cycle is input into the pulse generating unit 10, the pulse generating unit 10 generates the pulse signal S10 with the constant duty synchronized with the reference clock signal SCK. During the period of time when the output voltage Vout output from the output terminal 16 of the boost-type switching regulator 1a is below the target voltage VT, the second determination signal S14 output from the second comparing unit 14 has the high level. Accordingly, unless the first comparing unit 13 detects an excessive electrical current, the gate control signal S11 has the high level, so that the pulse signal S10 is supplied to the switching element Q1 as the gate signal S12.

As a result, the switching element Q1 repeats the on-off operation according to the pulse signal S10, so that the inductor L1 repeatedly accumulates and discharges energy. The induced electrical current discharged from the inductor L1 flows into the capacitor C1 through the diode D1, so that the capacitor C1 is charged. Accordingly, the output voltage Vout increases (the voltage increasing operation).

In the third embodiment, when the pulse signal S10 generates the third rising edge counted from the point when the voltage increasing operation is started, the flip-flop 33 at the final stage constituting the shift register outputs the voltage increasing operation determination signal S33 with the high level. As a result, the switching element Q3 is switched from the off state to the on state. When the switching element Q3 becomes the on state, the resistor element R13 is cancelled. Accordingly, as shown in FIG. 10, the second reference voltage Vref2 generated at the connection point between the resistor element R11 and the resistor element R12 is level-shifted toward the lower voltage side. In other words, in the boost-type switching regulator 1a, when the voltage increasing operation is started, the level of the second reference voltage Vref2 supplied to the non-inversion terminal of the second comparing unit 14 decreases.

Afterward, the voltage increasing operation is continued, and when the level of the second detection voltage VS2 corresponding to the output voltage Vout reaches the level of the second reference voltage Vref2, the second determination signal S14 output from the second comparing unit 14 becomes the low level. As a result, the gate control signal S11 becomes the low level, so that the pulse generating unit 10 is stopped being supplied to the switching element Q1. Accordingly, the switching element Q1 becomes the off state, and the inductor L1 stops accumulating energy, so that the output voltage Vout gradually decreases (the voltage decreasing operation).

As described above, in the third embodiment, the second detection voltage VS2 is level-shifted to the lower voltage side during the voltage increasing period. Accordingly, it is possible to switch to the voltage decreasing operation at the earlier stage. Accordingly, it is possible to release energy accumulated in the inductor L1 at the earlier stage, thereby making it possible to reduce the ripple generated in the output voltage Vout.

In the third embodiment, when the second determination signal S14 becomes the low level, the flip-flop 31, the flip-flop 32, and the flip-flop 33 constituting the shift register become the reset state. As a result, the voltage increasing operation determination signal S33 output from the flip-flop 33 at the final stage becomes the low level. Accordingly, the switching element Q3 is switched to the off state from the on state. When the switching element Q2 becomes the off state, the resistor element R13 starts working. As a result, the level of the second reference voltage Vref2 generated at the connection point between the resistor element R11 and the resistor element R12 is shifted toward the higher voltage side as shown in FIG. 10. In other words, when the boost-type switching regulator 1a starts the voltage decreasing operation, the level of the second reference voltage Vref2 supplied to the non-inversion terminal of the second comparing unit 14 increases.

Afterward, when the level of the second detection voltage VS2 becomes below the level of the second reference voltage Vref2 level-shifted to the higher voltage side, the second determination signal S14 output from the second comparing unit 14 becomes the high level. As a result, the gate control signal S11 becomes the high level. Accordingly, the switching element Q1 resumes the on-off operation, so that the output voltage Vout starts increasing. Through the operation described above, the boost-type switching regulator 1 is configured to control the supply and the non-supply of the pulse signal S10 with the constant duty through the gate control signal S11 according to the output voltage Vout. Accordingly, it is possible to adjust the output voltage Vout toward the target voltage VT.

Further, when the inductor electrical current IL flowing through the inductor L1 and the switching element Q1 exceeds the specific over electrical current protection operation threshold value IF, the first determination signal S13 output from the first comparing unit 13 becomes the low level. Accordingly, the gate control signal S11 becomes the low level, so that the pulse signal S10 is stopped being supplied into the switching element Q1. As a result, the switching element Q1 is turned off, so that it is possible to prevent the switching element Q1 from being overheated or damaged due to the excessive electrical current.

As described above, in the boost-type switching regulator 1a in the third embodiment, the shift register formed of the flip-flop 31, the flip-flop 32, and the flip-flop 33 is provided for determining whether the voltage increasing operation is started. When the flip-flop 21, the flip-flop 22, and the flip-flop 23 determine that the voltage increasing operation is started, the switching element Q3 is turned on, and the resistor element R13 is cancelled. Accordingly, the level of the second reference voltage Vref2 generated at the connection point between the resistor element R11 and the resistor element R12 is shifted to the lower voltage side. As a result, during the voltage increasing period, the second detection voltage VS2 reaches the second reference voltage Vref2 at the earlier stage. Accordingly, it is possible to switch to the voltage decreasing operation at the earlier stage. Accordingly, it is possible to release energy accumulated in the inductor L1 at the earlier stage. Therefore, it is possible to prevent the first comparing unit 13 from starting the over electrical current protection function, thereby making it possible to reduce the ripple generated in the output voltage Vout.

In the third embodiment, after the boost-type switching regulator 1a is switched to the voltage decreasing operation, the switching element Q3 becomes the on state, so that the resistor element R13 effectively functions as the voltage division resistor. As a result, the level of the second reference voltage Vref2 generated at the connection point between the resistor element R11 and the resistor element R12 is shifted toward the higher voltage side. Accordingly, during the voltage increasing period, even when the second reference voltage Vref2 is shifted toward the lower voltage side, it is possible to adjust the output voltage Vout toward the target voltage VT.

Further, in the boost-type switching regulator 1a in the third embodiment, the shift register formed of the flip-flop 21, the flip-flop 22, and the flip-flop 23 is provided for determining whether the voltage increasing operation is performed when the switching element Q1 repeats the on-off operation for a plurality of times. Accordingly, it is possible to securely determine whether the voltage increasing operation is started.

It should be noted that the shift register is formed of the flip-flop 31, the flip-flop 32, and the flip-flop 33 at the three stages. Alternatively, the shift register may be formed of more than or less than three stages of the flip-flops so as to increase or decrease the pulse number of the pulse signal S10 for determining the voltage increasing operation. Further, the configurations in the first to third embodiments may be combined.

The disclosure of Japanese Patent Application No. 2013-051029, filed on Mar. 13, 2013, is incorporated in the application by reference.

While the invention has been explained with reference to the specific embodiments of the invention, the explanation is illustrative and the invention is limited only by the appended claims.

What is claimed is:

1. A boost-type switching regulator, comprising:
an inductor;
a rectifying element;
a capacitor;
a first switching element;
an output terminal configured to output an output voltage;
a detection voltage generating unit configured to generate a detection voltage according to a level of the output voltage output from the output terminal;
an output voltage controlling unit configured to turn on and turn off the first switching element to increase the output voltage when a level of the detection voltage is smaller than a specific value, said output voltage controlling unit being configured to turn off the first switching element to decrease the output voltage when the level of the detection voltage is greater than the specific value; and
a detection voltage level shifting unit configured to shift the level of the detection voltage so that the level of the detection voltage during a voltage increasing period of the output voltage becomes greater than the level of the detection voltage during a voltage decreasing period of the output voltage,
wherein said detection voltage generating unit includes a plurality of resistor elements connected to the output terminal in series,
said detection voltage level shifting unit includes a plurality of flip flop circuits, a gate element, and a second switching element connected to one of the resistor elements in parallel, and
said flip flop circuits are connected to the second switching element through the gate element in series so that only one of the flip flop circuits is connected to the second switching element and others of the flip flop circuits are not connected to any switching element.

2. The boost-type switching regulator according to claim 1, further comprising a pulse generating unit configured to generate a pulse signal for turning on and turning off the first switching element,
wherein said detection voltage level shifting unit is configured to shift the level of the detection voltage to a higher voltage side when a specific number of continuous pulses in the pulse signal are supplied to the first switching element.

3. The boost-type switching regulator according to claim 2, wherein said pulse generating unit is configured to generate the pulse signal containing the continuous pulses in a variable number.

4. The boost-type switching regulator according to claim 1, wherein
said detection voltage generating unit is configured to generate the detection voltage determined by a voltage division ratio of the resistor elements and generated at a connection point of one of the resistor elements, and
said detection voltage level shifting unit is configured to shift the level of the detection voltage through varying the voltage division ratio.

5. A boost-type switching regulator, comprising:
an inductor;
a rectifying element;
a capacitor;
a switching element;
an output terminal configured to output an output voltage;
a detection voltage generating unit configured to generate a detection voltage according to a level of the output voltage output from the output terminal;
an output voltage controlling unit configured to turn on and turn off the first switching element to increase the output voltage when a level of the detection voltage is smaller than a level of a reference voltage, said output voltage controlling unit being configured to turn off the first switching element to decrease the output voltage when the level of the detection voltage is greater than the level of the reference voltage; and
a reference voltage level shifting unit configured to shift the level of the reference voltage so that the level of the reference voltage during a voltage increasing period of the output voltage becomes smaller than the level of the reference voltage during a voltage decreasing period of the output voltage, wherein said detection voltage generating unit includes a plurality of resistor elements connected to the output terminal in series, said detection voltage level shifting unit includes a plurality of flip flop circuits, a gate element, and a second switching element connected to one of the resistor elements in parallel, and said flip flop circuits are connected to the second switching element through the gate element in series so that only one of the flip flop circuits is connected to the second switching element and others of the flip flop circuits are not connected to any switching element.

6. The boost-type switching regulator according to claim 5, further comprising a pulse generating unit configured to generate a pulse signal for turning on and turning off the switching element.

7. The boost-type switching regulator according to claim 6, wherein said inductor includes one end portion connected to a power source input terminal, said rectifying element includes an input end portion connected to the other end portion of the inductor, said capacitor includes one end portion connected to the output terminal and the other end portion connected to a specific potential, and said switching element is connected to the other end portion of the inductor.

8. The boost-type switching regulator according to claim 1, further comprising an over electrical current protection unit configured to turn off the first switching element when an electrical current flowing through the inductor and the first switching element exceeds a specific level.

9. The boost-type switching regulator according to claim 5, further comprising an over electrical current protection unit configured to turn off the switching element when an electrical current flowing through the inductor and the switching element exceeds a specific level.

10. The boost-type switching regulator according to claim 2, wherein said pulse generating unit is configured to generate the pulse signal having a constant duty.

11. The boost-type switching regulator according to claim 6, wherein said pulse generating unit is configured to generate the pulse signal having a constant duty.

12. A semiconductor device for a boost-type switching regulator including an inductor; a rectifying element; a capacitor; a switching element; and an output terminal, comprising:

a first terminal connected to the output terminal;

a second terminal connected to the switching element;

a detection voltage generating unit connected to the first terminal and configured to generate a detection voltage according to a level of the output voltage output from the output terminal;

an output voltage controlling unit configured to turn on and turn off the switching element through supplying a pulse signal to the switching element through the second terminal to increase the output voltage when a level of the detection voltage is smaller than a specific value, said output voltage controlling unit being configured to turn off the switching element to decrease the output voltage when the level of the detection voltage is greater than the specific value; and a detection voltage level shifting unit configured to shift the level of the detection voltage so that the level of the detection voltage during a voltage increasing period of the output voltage becomes greater than the level of the detection voltage during a voltage decreasing period of the output voltage, wherein said detection voltage generating unit includes a plurality of resistor elements connected to the output terminal in series, said detection voltage level shifting unit includes a plurality of flip flop circuits, a gate element, and a second switching element connected to one of the resistor elements in parallel, and said flip flop circuits are connected to the second switching element through the gate element in series so that only one of the flip flop circuits is connected to the second switching element and others of the flip flop circuits are not connected to any switching element.

13. A semiconductor device for a boost-type switching regulator including an inductor; a rectifying element; a capacitor; a switching element; and an output terminal, comprising:

a first terminal connected to the output terminal;

a second terminal connected to the switching element;

a detection voltage generating unit connected to the first terminal and configured to generate a detection voltage according to a level of the output voltage output from the output terminal;

an output voltage controlling unit configured to turn on and turn off the switching element through supplying a pulse signal to the switching element through the second terminal to increase the output voltage when a level of the detection voltage is smaller than a level of a reference voltage, said output voltage controlling unit being configured to turn off the switching element to decrease the output voltage when the level of the detection voltage is greater than the level of the reference voltage; and a reference voltage level shifting unit configured to shift the level of the reference voltage so that the level of the reference voltage during a voltage increasing period of the output voltage becomes greater than the level of the reference voltage during a voltage decreasing period of the output voltage, wherein said detection voltage generating unit includes a plurality of resistor elements connected to the output terminal in series, said detection voltage level shifting unit includes a plurality of flip flop circuits, a gate element, and a second switching element connected to one of the resistor elements in parallel, and said flip flop circuits are connected to the second switching element through the gate element in series so that only one of the flip flop circuits is connected to the second switching element and others of the flip flop circuits are not connected to any switching element.

* * * * *